United States Patent
Yoo et al.

(10) Patent No.: US 10,951,908 B2
(45) Date of Patent: Mar. 16, 2021

(54) METHOD AND DEVICE FOR DECODING IMAGE ACCORDING TO INTRA PREDICTION IN IMAGE CODING SYSTEM

(71) Applicant: LG ELECTRONICS INC., Seoul (KR)

(72) Inventors: Sunmi Yoo, Seoul (KR); Jaehyun Lim, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/615,329

(22) PCT Filed: Nov. 27, 2017

(86) PCT No.: PCT/KR2017/013609
§ 371 (c)(1),
(2) Date: Nov. 20, 2019

(87) PCT Pub. No.: WO2018/216862
PCT Pub. Date: Nov. 29, 2018

(65) Prior Publication Data
US 2020/0204814 A1      Jun. 25, 2020

Related U.S. Application Data

(60) Provisional application No. 62/510,278, filed on May 24, 2017.

(51) Int. Cl.
*H04N 19/44* (2014.01)
*H04N 19/105* (2014.01)
*H04N 19/132* (2014.01)
*H04N 19/159* (2014.01)
*H04N 19/176* (2014.01)
(Continued)

(52) U.S. Cl.
CPC ............ *H04N 19/44* (2014.11); *H04N 19/105* (2014.11); *H04N 19/11* (2014.11); *H04N 19/132* (2014.11); *H04N 19/159* (2014.11); *H04N 19/176* (2014.11); *H04N 19/593* (2014.11); *H04N 19/182* (2014.11)

(58) Field of Classification Search
None
See application file for complete search history.

(56) References Cited

U.S. PATENT DOCUMENTS

| 9,237,357 B2 * | 1/2016 | Park | H04N 19/176 |
| 2013/0128961 A1 * | 5/2013 | Kim | H04N 19/82 375/240.03 |

(Continued)

FOREIGN PATENT DOCUMENTS

WO      2017052118 A1      3/2017

*Primary Examiner* — Tyler W. Sullivan
(74) *Attorney, Agent, or Firm* — Dentons US LLP

(57) ABSTRACT

According to the present disclosure, an image decoding method performed by a decoding device comprises the steps of: deriving a first intra prediction mode of a current block; deriving neighboring samples including left neighboring samples and upper neighboring samples of the current block; deriving a second intra prediction mode of a target sample on the basis of a location of the target sample and the first intra prediction mode of the current block; and performing prediction for the target sample on the basis of the second intra prediction mode of the target sample.

14 Claims, 17 Drawing Sheets

(51) Int. Cl.
*H04N 19/593* (2014.01)
*H04N 19/11* (2014.01)
*H04N 19/182* (2014.01)

(56) References Cited

U.S. PATENT DOCUMENTS

| | | |
|---|---|---|
| 2015/0271503 A1 | 9/2015 | Jeon et al. |
| 2016/0050422 A1 | 2/2016 | Rosewarne et al. |
| 2016/0198192 A1 | 7/2016 | Lim et al. |
| 2016/0309160 A1* | 10/2016 | Oh .................. H05K 999/99 |
| 2017/0142422 A1 | 5/2017 | Park et al. |
| 2017/0222084 A1* | 8/2017 | Linder ............... G01R 19/0092 |
| 2018/0176587 A1* | 6/2018 | Panusopone ......... H04N 19/174 |
| 2018/0255299 A1* | 9/2018 | Lee .................... H04N 19/70 |
| 2018/0262763 A1* | 9/2018 | Seregin ............... H04N 19/619 |
| 2018/0295384 A1* | 10/2018 | Son ..................... H04N 19/105 |
| 2018/0332284 A1* | 11/2018 | Liu .................... H04N 19/182 |
| 2019/0104303 A1* | 4/2019 | Xiu .................... H04N 19/182 |
| 2019/0116381 A1* | 4/2019 | Lee .................... H04N 19/105 |
| 2019/0149828 A1* | 5/2019 | Jeong ................... H04N 19/96 375/240.12 |
| 2019/0200011 A1* | 6/2019 | Yoo .................... H04N 19/176 |
| 2019/0222837 A1* | 7/2019 | Lee .................... H04N 19/44 |
| 2019/0238835 A1* | 8/2019 | Lee .................... H04N 19/70 |
| 2019/0394460 A1* | 12/2019 | Lee .................... H04N 19/86 |
| 2020/0007891 A1* | 1/2020 | Kang ................... H04N 19/11 |
| 2020/0021806 A1* | 1/2020 | Kim .................... H04N 19/105 |
| 2020/0036970 A1* | 1/2020 | Yoo .................... H04N 19/176 |
| 2020/0077086 A1* | 3/2020 | Lee .................... H04N 19/159 |
| 2020/0099935 A1* | 3/2020 | Lee .................... H04N 19/159 |

* cited by examiner

METHOD AND DEVICE FOR DECODING IMAGE ACCORDING TO INTRA PREDICTION IN IMAGE CODING SYSTEM

CROSS-REFERENCE TO RELATED APPLICATIONS

This application is the National Stage filing under 35 U.S.C. 371 of International Application No. PCT/KR2017/013609, filed on Nov. 27, 2017, which claims the benefit of U.S. Provisional Application No. 62/510,278 filed on May 24, 2017, the contents of which are all hereby incorporated by reference herein in their entirety.

BACKGROUND OF THE DISCLOSURE

Field of the Disclosure

The present disclosure relates to a video coding technique, and more particularly, to a video decoding method and device based on intra-prediction in an image coding system.

Related Art

Demand for high-resolution, high-quality images such as High Definition (HD) images and Ultra High Definition (UHD) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present disclosure provides a method and device for improving image coding efficiency.

The present disclosure also provides an intra-prediction method and device for performing a prediction of a current block based on a plurality of intra-prediction modes.

The present disclosure also provides a method and device for deriving an intra-prediction mode for a target sample of a current block based on a position of the target sample.

In an aspect, an image decoding method performed by a decoding apparatus is provided. The method includes deriving a first intra-prediction mode for a current block, deriving neighboring samples including left neighboring samples and upper neighboring samples of the current block, deriving a second intra-prediction mode for a target sample based on a position of the target sample and the first intra-prediction mode and performing prediction of the target sample based on the second intra-prediction mode for the target sample.

In another aspect, a decoding apparatus for performing an image decoding is provided. The decoding apparatus includes an entropy decoder for obtaining prediction information for a current block and a predictor for deriving a first intra-prediction mode for the current block, for deriving neighboring samples including left neighboring samples and upper neighboring samples of the current block, for deriving a second intra-prediction mode for a target sample based on a position of the target sample and the first intra-prediction mode, and for performing prediction of the target sample based on the second intra-prediction mode for the target sample.

In still another aspect, a video encoding method performed by an encoding apparatus is provided. The method includes determining a first intra-prediction mode for a current block, deriving neighboring samples including left neighboring samples and upper neighboring samples of the current block, deriving a second intra-prediction mode for a target sample based on a position of the target sample and the first intra-prediction mode, performing prediction of the target sample based on the second intra-prediction mode for the target sample, and generating and encoding prediction information for the current block and outputting it.

In still another aspect, a video encoding apparatus is provided. The encoding apparatus includes a predictor for determining a first intra-prediction mode for a current block, deriving neighboring samples including left neighboring samples and upper neighboring samples of the current block, deriving a second intra-prediction mode for a target sample based on a position of the target sample and the first intra-prediction mode, performing prediction of the target sample based on the second intra-prediction mode for the target sample and an entropy encoder for generating and encoding prediction information for the current block and outputting it.

According to the present disclosure, a prediction of a current block can be performed based on a plurality of intra-prediction modes according to a specific condition, and through this, an object of a curved boundary included in the current block is predicted more accurately, and accordingly, a prediction accuracy for the current block can be improved, and a residual for the current block is reduced, and a coding rate can be improved.

According to the present disclosure, a second intra-prediction mode for a target sample of the current block is derived and a distance between the target sample and a reference sample can be reduced, and through this, a prediction accuracy for the current block can be improved, and a residual for the current block is reduced, and a coding rate can be improved.

DESCRIPTION OF EXEMPLARY EMBODIMENTS

Figure 1:
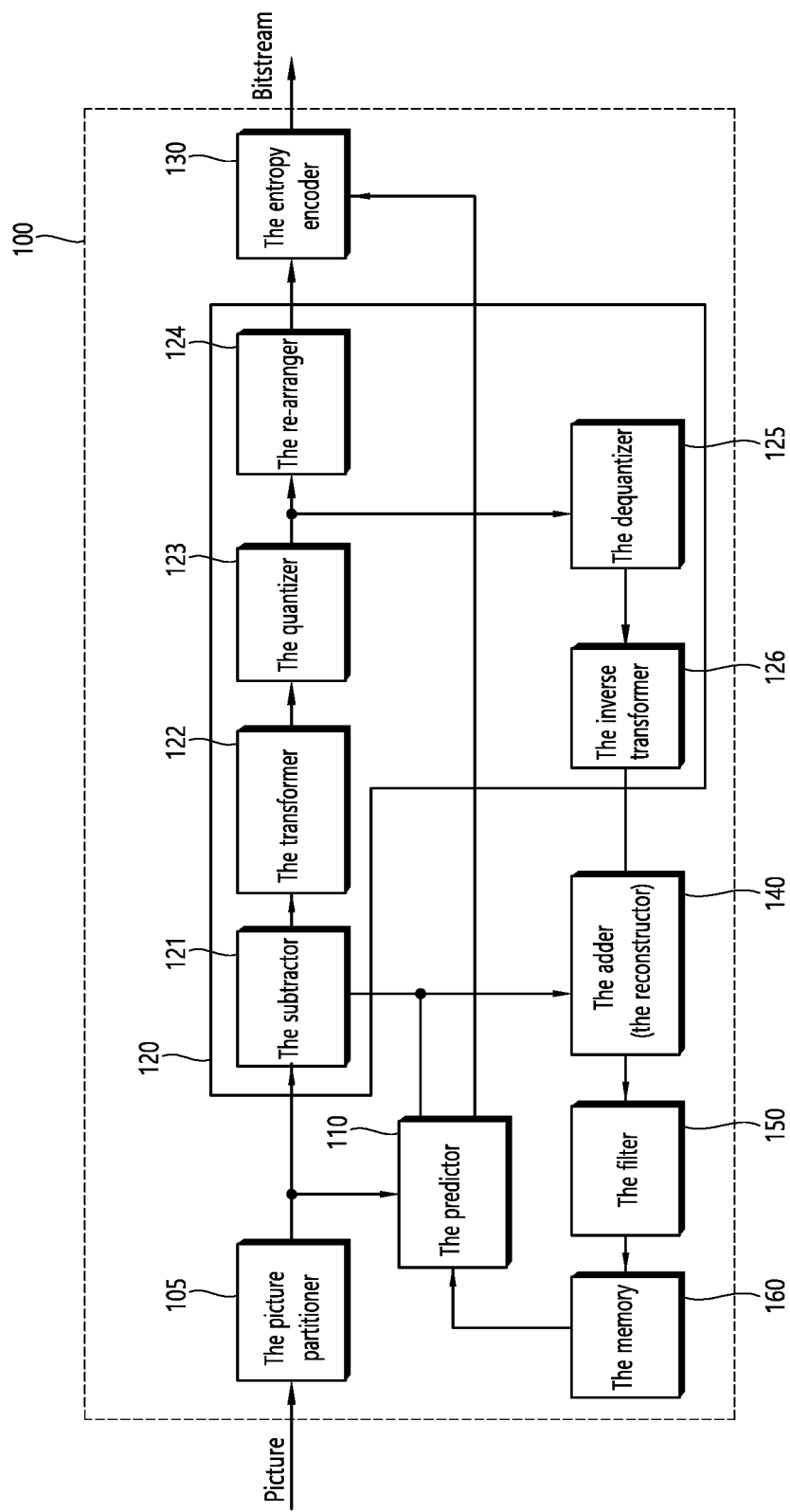
FIG. 1 is a schematic diagram illustrating a configuration of a video encoding device to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present disclosure is applicable.

Referring to FIG. 1, a video encoding device 100 may include a picture partitioner 105, a predictor 110, a residual processor 120, an adder 150, a filter 255, and a memory 160. The residual processor 120 may include a subtractor 121, a transformer 122, a quantizer 123, a re-arranger 124, a inverse-quantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The inverse-quantizer 125 inverse-quantizes values (transform coefficients) quantized by the quantizer 123 and the inverse transformer 126 inversely transforms values inverse-quantized by the inverse-quantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
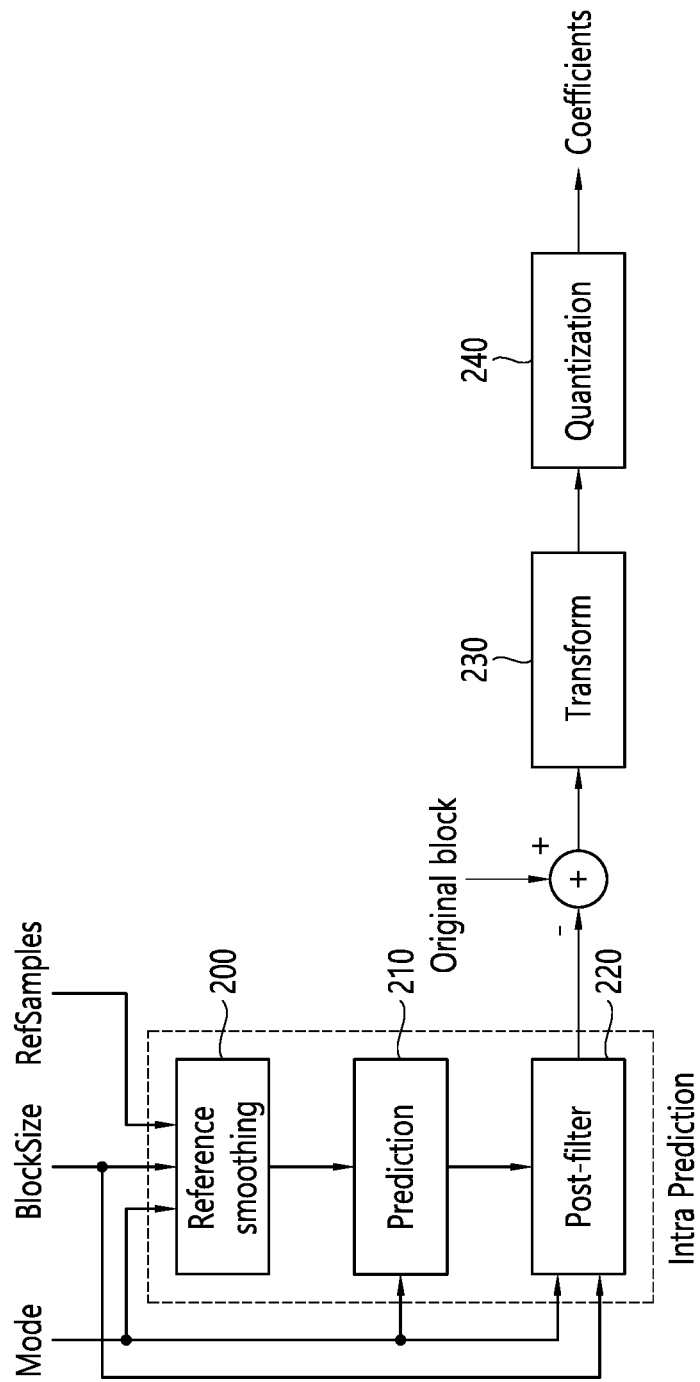
FIG. 2 illustrates another example of a video encoding device to which the present disclosure is applicable.

FIG. 2 illustrates another example of a video encoding device to which the present disclosure is applicable.

Referring to FIG. 2, the video encoding device includes an intra-predictor, a reference smoother 200, a predictor 210, a post-filter 220, a transformer 230, and a quantizer 240. Here, the intra-predictor may include a reference smoother 200, a predictor 210, and a post-filter 220.

When intra-prediction is applied to a current block, the reference smoother 200 may perform a smoothing process on left neighboring samples and upper neighboring samples used for intra-prediction of the current block in a picture (hereinafter, referred to as a current picture) to which the current block belongs, based on a size of the current block and a sample value. Accordingly, it is possible to prevent visual artifacts regarding prediction samples of the current block, which may occur due to differences between sample values of the left neighboring samples and the upper neighboring samples.

The predictor 210 may (i) derive a prediction sample based on an average or interpolation of the left neighboring samples and the upper neighboring samples of the current block, or (ii) may derive the prediction samples based on neighboring samples present in a specific (prediction) direction regarding prediction samples among the left neighboring samples and the upper neighboring samples. The case (i) may be referred to as a non-directional mode or a non-angular mode and the case (ii) may be referred to as a directional mode or an angular mode. In intra-prediction, the prediction mode may have 33 directional prediction modes and at least two non-directional modes. The non-directional mode may include a DC prediction mode and a planar mode (Planar mode). The predictor 210 may also determine a prediction mode applied to the current block using a prediction mode applied to a neighboring block.

When a prediction sample of the current block is derived based on the vertical mode, the horizontal mode, or the DC mode, the post-filter unit 220 may perform post-processing filtering to mitigate discontinuity between the current block and neighboring samples. Thereafter, the encoding device may derive, as a residual sample, a difference between the prediction sample and an original sample, and the transformer 230 may transform the residual sample in units of blocks to generate transform coefficients Also, the quantizer 240 may quantize the transform coefficients to generate quantized transform coefficients.

Figure 3:
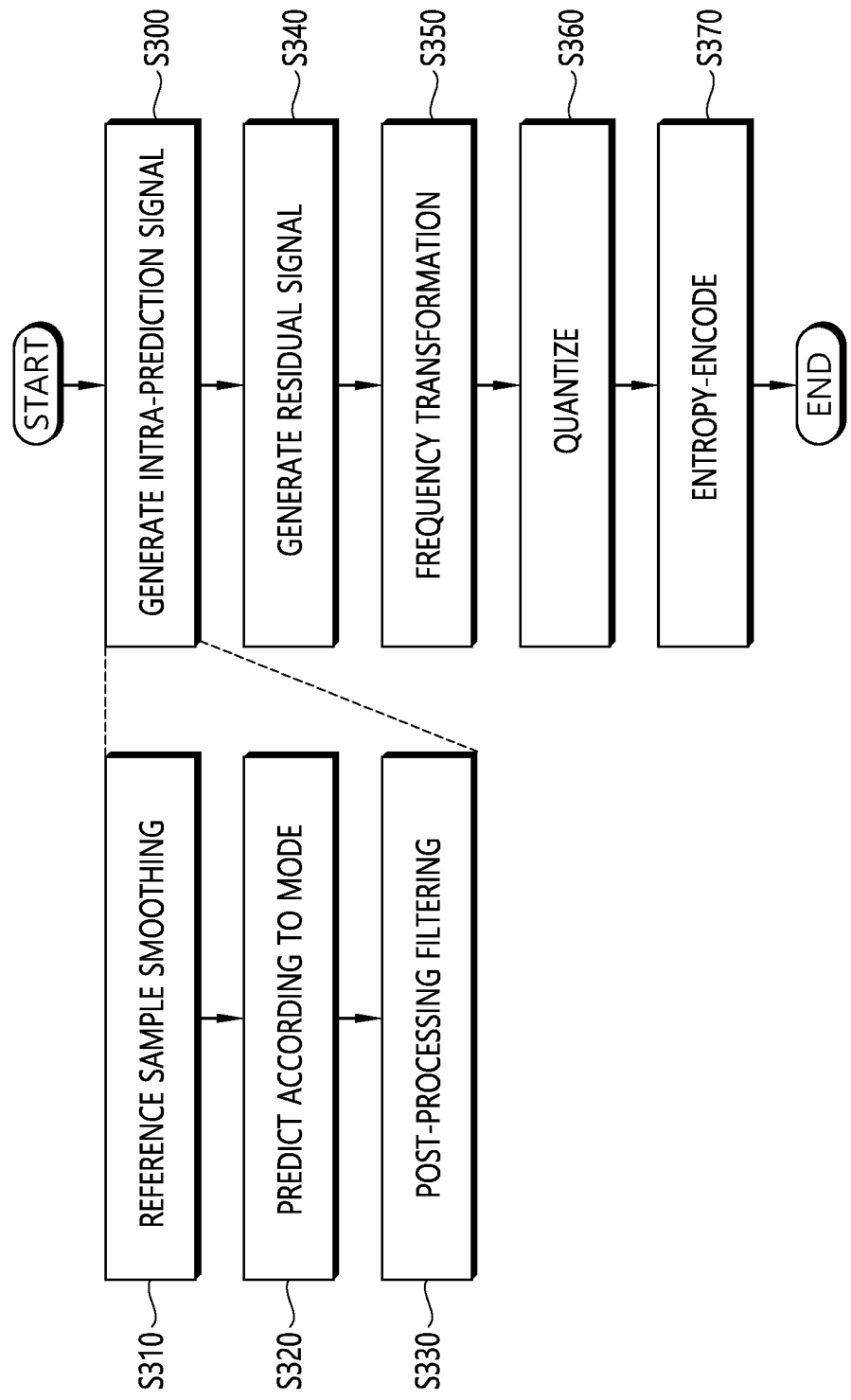
FIG. 3 illustrates an example of a process of performing intra-prediction in an encoding device.

FIG. 3 illustrates an example of a process of performing intra-prediction in the encoding device. The encoding device may perform intra-prediction to generate a prediction sample of a current block (S300). The prediction sample may be referred to as a prediction signal or an intra-prediction signal. Specifically, the encoding device may smooth (i.e., perform a smoothing process on) left neighboring samples and upper neighboring samples used for intra-prediction of the current block based on a size of the current block, mode information, and a sample value (S310). Thereafter, as described above, the encoding device may perform prediction according to the intra-prediction mode to generate the prediction sample (S320) and perform post-processing filtering to mitigate discontinuity between the current block and the neighboring samples (S330). The encoding device may generate, as a residual sample, a difference between the prediction sample and the original sample (S340) and transform the residual sample in units of blocks to generate transform coefficients. Further, the encoding device may quantize the transform coefficients to generate quantized transform coefficients (S360) and entropy-encode the quantized transform coefficients to perform signaling (S370).

Figure 4:
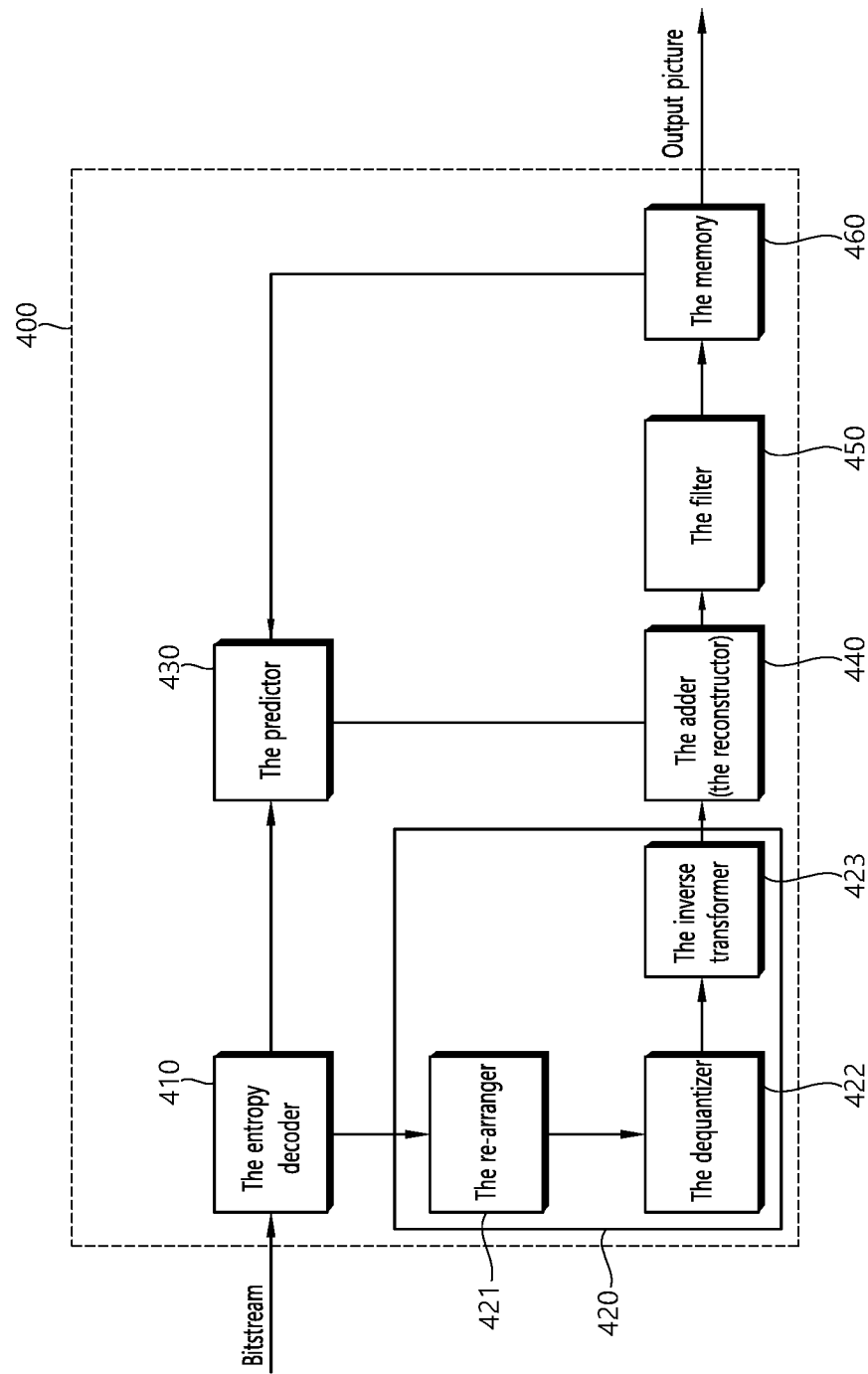
FIG. 4 is a schematic diagram illustrating a configuration of a video decoding device to which the present disclosure is applicable.

FIG. 4 briefly illustrates a structure of a video decoding device to which the present disclosure is applicable.

Referring to FIG. 4, a video decoding device 400 may include an entropy decoder 410, a residual processor 420, a predictor 430, an adder 440, a filter 450, and a memory 460. The residual processor 420 may include a re-arranger 421, an inverse-quantizer 422, an inverse transformer 423.

When a bitstream including video information is input, the video decoding device 400 may reconstruct a video in association with a process by which video information is processed in the video encoding device.

For example, the video decoding device 400 may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 410 may parse the bitstream to output information required for video reconstruction or picture reconstruction. For example, the entropy decoder 410 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 410 may be provided to the predictor 450 and residual values, that is, quantized transform coefficients, on which entropy decoding has been performed by the entropy decoder 410 may be input to the re-arranger 421.

The re-arranger 421 may rearrange the quantized transform coefficients into a two-dimensional block form. The re-arranger 421 may perform rearrangement corresponding to coefficient scanning performed by the encoding device. Although the re-arranger 421 is described as a separate component, the re-arranger 421 may be a part of the inverse-quantizer 422.

The inverse-quantizer 422 may de-quantize the quantized transform coefficients based on a (de)quantization parameter to output a transform coefficient. In this case, information for deriving a quantization parameter may be signaled from the encoding device.

The inverse transformer 423 may inverse-transform the transform coefficients to derive residual samples.

The predictor 430 may perform prediction on a current block, and may generate a predicted block including prediction samples for the current block. A unit of prediction performed in the predictor 430 may be a coding block or may be a transform block or may be a prediction block.

The predictor 430 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 430 may derive a prediction sample for a current block based on a neighboring reference sample in a current picture. The predictor 430 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 430 may derive a prediction sample for a current block based on a sample specified in a reference picture according to a motion vector. The predictor 430 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 430 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 430 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 430 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor 430 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 440 may add a residual sample to a prediction sample to reconstruct a current block or a current picture. The adder 440 may reconstruct the current picture by adding the residual sample to the prediction sample in units of a block. When the skip mode is applied, a residual is not transmitted and thus the prediction sample may become a reconstructed sample. Although the adder 440 is described as a separate component, the adder 440 may be a part of the predictor 430. Meanwhile, the adder 440 may be referred to as a reconstructor or reconstructed block generator.

The filter 450 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 460 may store a reconstructed picture (decoded picture) or information necessary for decoding. Here, the reconstructed picture may be the reconstructed picture filtered by the filter 450. For example, the memory 460 may store pictures used for inter-prediction. Here, the pictures used for inter-prediction may be designated according to a reference picture set or a reference picture list. A reconstructed picture may be used as a reference picture for other pictures. The memory 460 may output reconstructed pictures in an output order.

Figure 5:
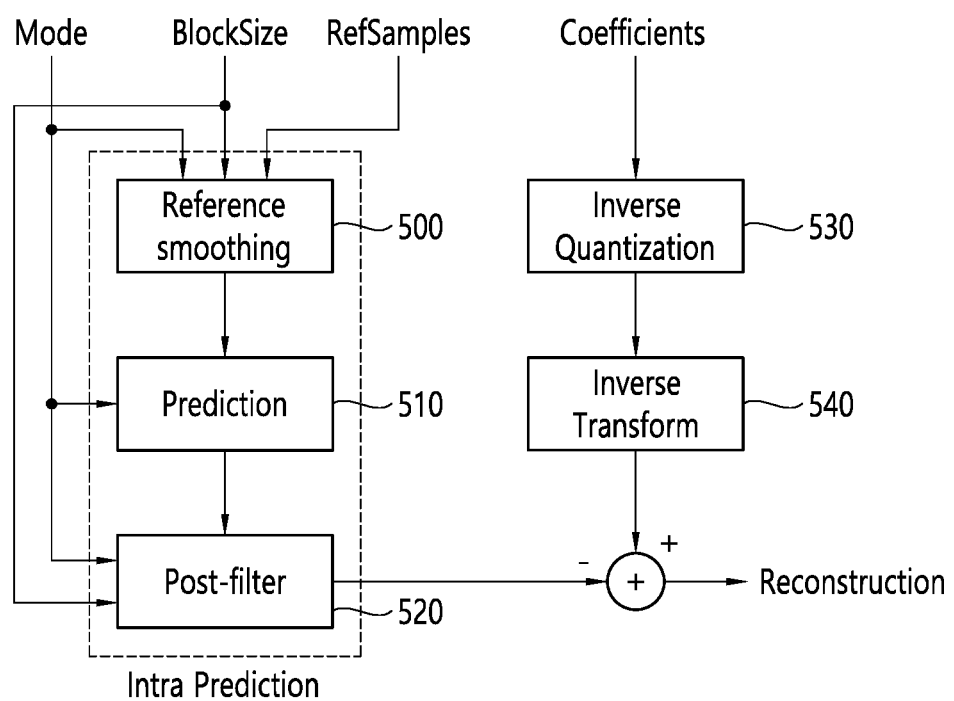
FIG. 5 illustrates another example of a video decoding device to which the present disclosure is applicable.

FIG. 5 illustrates another example of a video decoding device to which the present disclosure is applicable.

Referring to FIG. 5, the video encoding device includes an intra-predictor, a reference smoother 500, a predictor 810, a post-filter 520, an inverse-quantizer 530, and an inverse-transformer 540. Here, the intra-predictor may include the reference smoother 500, the predictor 510, and the post-filter 520. The intra-predictor may derive a prediction sample for a current block by applying a directional mode or a non-directional mode based on a neighboring reference sample of the current block. Here, the prediction mode to be applied to the current block may be determined using an intra-prediction mode of a neighboring block.

Specifically, when intra-prediction is applied to the current block, the reference smoother 500 may perform a smoothing process on the left neighboring samples and the upper neighboring samples used for intra-prediction of the current block in a picture (hereinafter, referred to as a current picture) to which the current block belongs, based on the size of the current block and the sample value. Thus, it is possible to prevent visual artifacts regarding the prediction samples of the current block, which may occur due to differences between sample values of the left neighboring samples and the upper neighboring samples.

The predictor 510 may derive the prediction sample based on an average or interpolation of the left neighboring samples and the upper neighboring samples of the current block (case (i)) or may derive the prediction sample based on a neighboring sample present in a specific (prediction) direction regarding the prediction sample among the left neighboring samples and the upper neighboring samples (case (ii)). The case (i) may be called a non-directional mode or a non-angular mode, and the case (ii) may be called a directional mode or an angular mode. In the intra-prediction, the prediction mode may include, for example, 33 directional prediction modes and at least two non-directional modes. The non-directional modes may include a DC prediction mode and a planar mode. The predictor 510 may determine the prediction mode to be applied to the current block using the prediction mode applied to the neighboring block.

When a prediction sample of the current block is derived based on the vertical mode, the horizontal mode, or the DC mode, the post-filter unit 520 may perform post-processing filtering to mitigate discontinuity between the current block and the neighboring samples. Thereafter, the inverse-quantizer 530 may inverse-quantize the quantized transform coefficients received from the encoding device, and the inverse-transformer 540 may inversely transform the inverse-quantized transform coefficients to generate residual samples in units of blocks. The decoding device may recover the current block encoded based on intra-prediction, based on the residual sample and the prediction sample.

Figure 6:
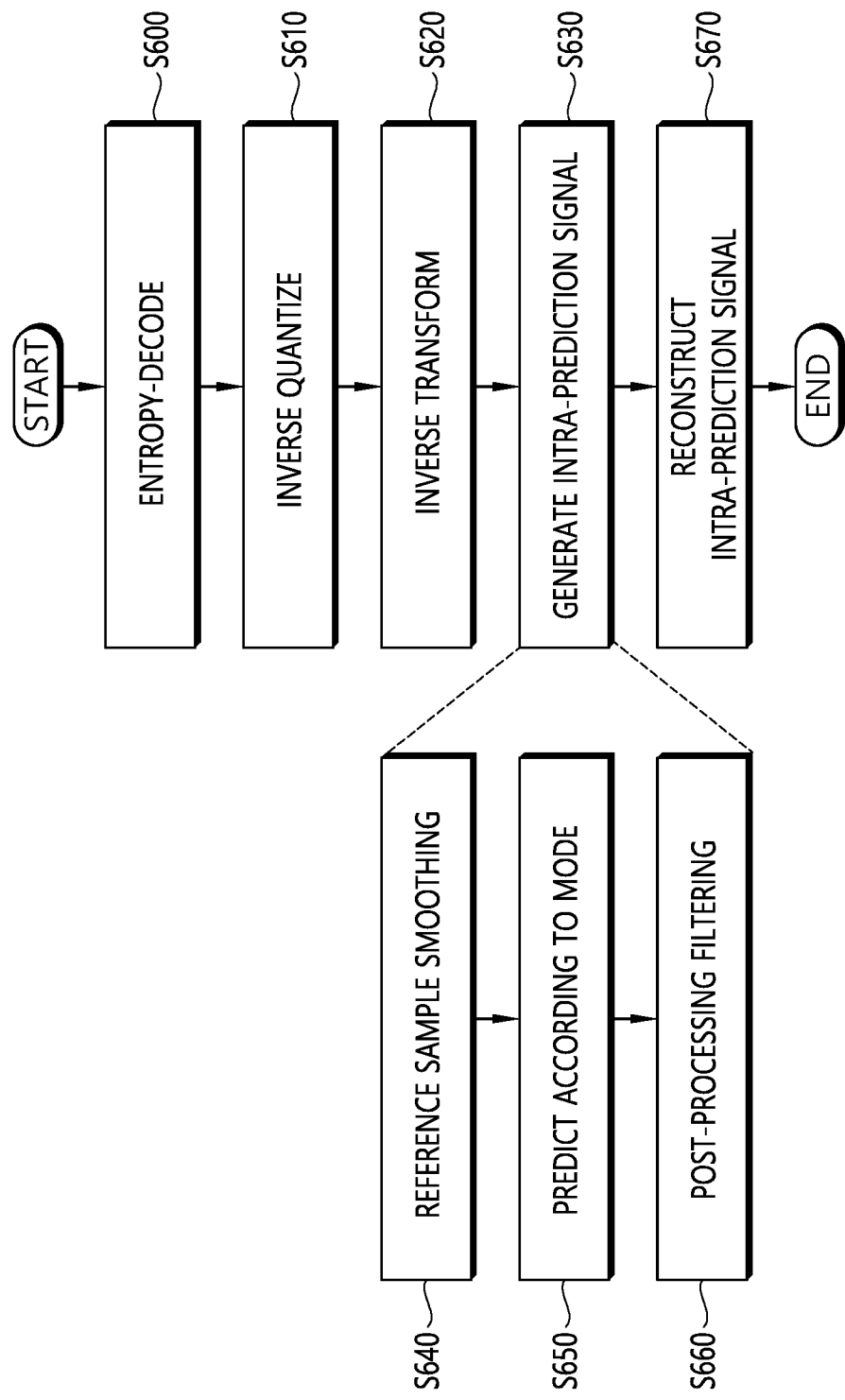
FIG. 6 illustrates an example of a process of performing intra-prediction in a decoding device.

FIG. 6 illustrates an example of a process of performing intra-prediction in a decoding device. The decoding device entropy-decodes entropy-encoded information received through a bitstream to obtain quantized transform coefficients (S600). Next, the decoding device may inverse-quantize the quantized transform coefficients to obtain transform coefficients (S610) and inversely-transform the transform coefficients to generate a residual sample in units of blocks (S620). Next, the decoding device may perform intra-prediction to generate a prediction sample of the current block (S630). The prediction sample may be referred to as a prediction signal or an intra-prediction signal. Specifically, the decoding device may perform a smoothing process on the left neighboring samples and the upper neighboring samples used for intra-prediction of the current block based on a size of the current block and sample value (S640). Thereafter, the decoding device may perform prediction according to the intra-prediction mode to generate the prediction sample as described above (S650) and perform post-processing filtering to reduce discontinuity between the current block and the neighboring samples (S660). The decoding device may add the prediction sample and the residual sample to generate a reconstructed sample of the current block (S670).

When prediction is performed on the current block as described above, the prediction may be performed based on the intra-prediction mode. For example, the intra-prediction may be performed based on a neighboring sample which has already been encoded/decoded at a decoding time of the current block. That is, the prediction sample of the current block may be reconstructed using the left neighboring samples and the upper neighboring samples of the current block. The left neighboring samples and the upper neighboring samples may be represented as shown in FIG. 7.

Figure 7:
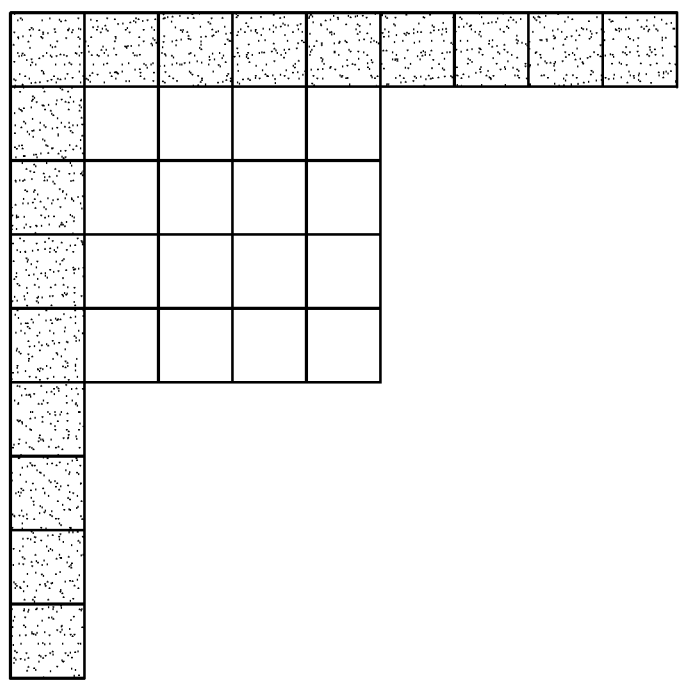
FIG. 7 illustrates an example of left neighboring samples and upper neighboring samples used for intra-prediction of the current block.

FIG. 7 illustrates an example of the left neighboring samples and upper neighboring samples used for intra-prediction of the current block. When intra-prediction is performed on the current block, an intra-prediction mode regarding the current block may be derived and a prediction sample regarding the current block may be generated using at least one of the left neighboring samples and the upper neighboring samples according to the intra-prediction mode. The left neighboring samples and the upper neighboring samples used for intra-prediction of the current block may undergo a smoothing process based on the size of the current block and the sample value. That is, filtering may be performed to reduce a difference between the sample values of the left neighboring samples and the upper neighboring samples based on the size of the current block and the sample values. Thus, it is possible to prevent visual artifacts regarding the prediction samples of the current block, which may occur due to differences between sample values of the left neighboring samples and the upper neighboring samples.

Here, the intra-prediction mode may include two non-directional intra-prediction modes and 33 directional intra-prediction modes. The non-directional intra-prediction modes may include a planar intra-prediction mode and a DC intra-prediction mode, and the directional intra-prediction modes may include intra-prediction modes #2 to #34. The planar intra-prediction mode may be referred to as a planar mode, and the DC intra-prediction mode may be referred to as a DC mode. The intra-prediction mode #10 may indicate a horizontal intra-prediction mode or a horizontal mode, the intra-prediction mode #26 indicates a vertical intra-prediction mode or a vertical mode, based on which a prediction direction of the directional intra-mode may be expressed by an angle. In other words, a relative angle corresponding to each intra-prediction mode may be expressed with reference to a horizontal reference angle 0° corresponding to the intra-prediction mode #10, and a relative angle corresponding to each intra-prediction mode may be expressed with reference to a vertical reference angle 0° corresponding to the intra-prediction mode #26.

In addition, demand for high-quality video is increasing, and in order to increase efficiency of a video codec, the number of directional intra-prediction directions may increase to 65. That is, the intra-prediction mode may include two non-directional intra-prediction modes and 65 directional intra-prediction modes. The non-directional intra-prediction modes may include a planar intra-prediction mode and a DC intra-prediction mode, and the directional intra-prediction modes may include intra-prediction modes #2 to #66.

Figure 8:
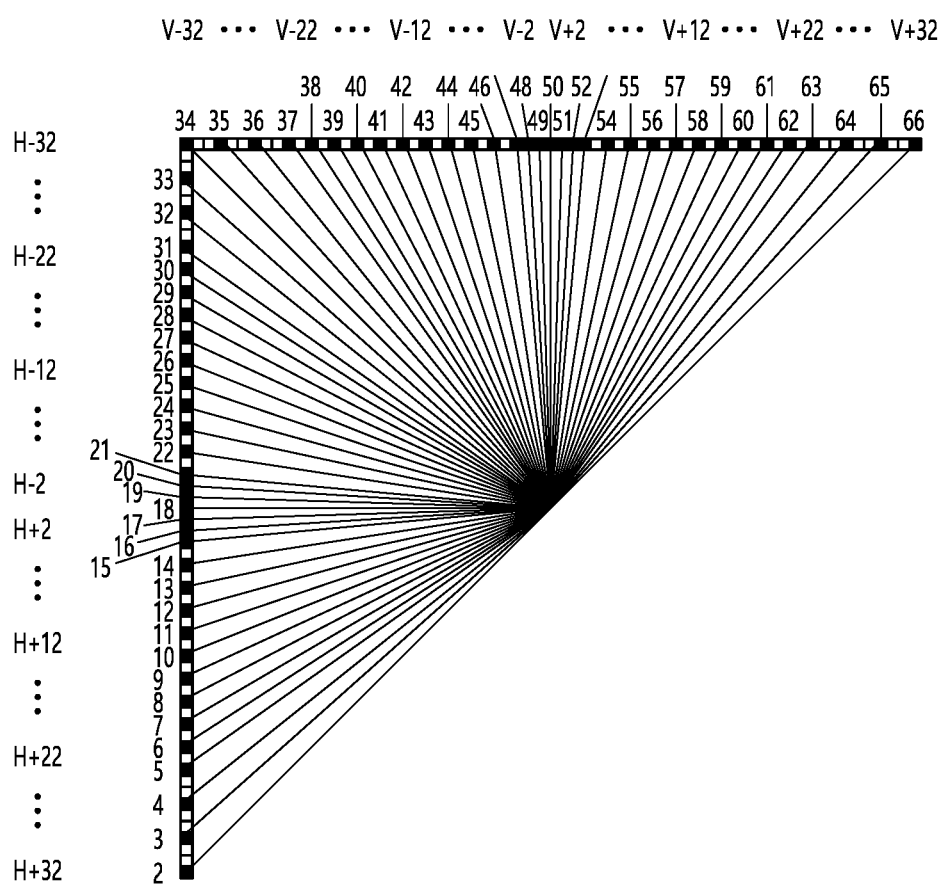
FIG. 8 illustrates an example of intra-directional modes of 65 prediction directions.

FIG. 8 illustrates intra-directional modes of 65 prediction directions.

Referring to FIG. 8, intra-prediction modes having horizontal directionality and intra-prediction modes having vertical directionality may be classified based on an intra-prediction mode #34 having an upper left diagonal prediction direction. H and V in FIG. 8 represent the horizontal directionality and the vertical directionality, respectively, and the numbers from −32 to 32 represent displacements of 1/32 unit on sample grid positions. The intra-prediction modes #2 to #33 have the horizontal directionality and the intra-prediction modes #34 to #66 have the vertical directionality. The intra-prediction mode #18 and the intra-prediction mode #50 represent a horizontal intra-prediction mode and a vertical intra-prediction mode, respectively, based on which a prediction direction of an angular intra-prediction mode may be expressed by an angle. In other words, a relative angle corresponding to each intra-prediction mode may be expressed based on a horizontal reference angle 0° corresponding to the intra-prediction mode #18, and a relative angle corresponding to each intra-prediction mode may be expressed based on a vertical reference angle 0° corresponding to the intra-prediction mode #50.

In case that the directional intra-prediction mode is applied to the current block, a prediction sample of the target sample may be derived based on a reference sample located in a prediction direction of the directional intra-prediction mode with respect to a target sample on which intra-prediction is performed in the current block. That is, the reference sample located in the prediction direction may be copied and derived as the prediction sample. Here, the reference sample may represent a neighboring sample located in a prediction direction of the directional intra-prediction mode with respect to the target sample among the upper neighboring samples and the left neighboring samples of the current block. Meanwhile, when there is no reference sample in units of integer samples in the prediction direction of the directional intra-prediction mode based the target sample, that is, when a position of a reference sample located in the prediction direction of the directional intra-prediction mode is a fractional sample position based on the target sample, a sample value of the reference sample may be derived through interpolation between integer samples adjacent to the left and right of the reference sample and the prediction sample of the target sample may be derived based on the reference sample. Interpolation between the integer samples may be performed based on a distance ratio of the reference sample and the integer samples.

Figure 9:
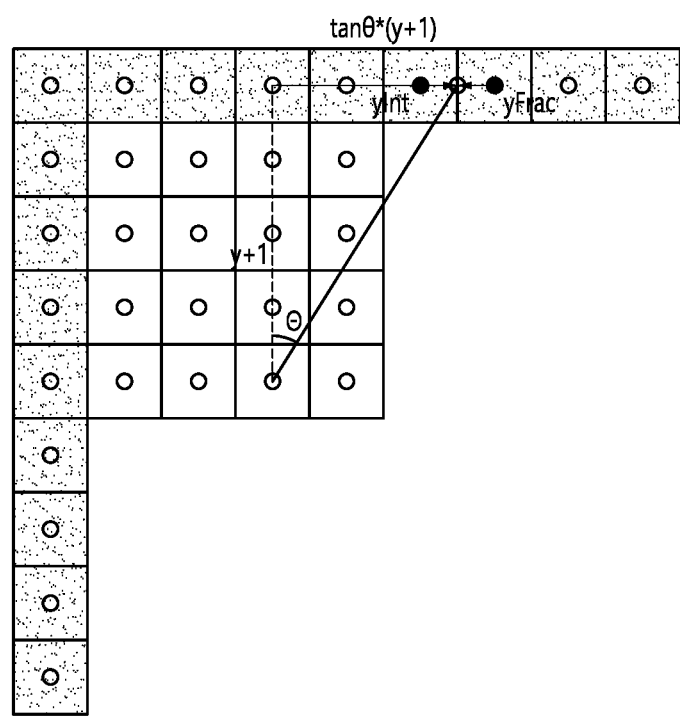
FIG. 9 illustrates an example in which prediction samples of a target sample are derived based on integer samples adjacent to the left and right of a reference sample when a position of the reference sample located in a prediction direction of the directional intra-prediction mode is a position of a fractional sample.

FIG. 9 is a view illustrating an example in which when a position of a reference sample located in a prediction direction of the directional intra-prediction mode is a fractional sample position, a prediction sample of the target sample is derived based on integer samples adjacent to the left and right of the reference sample.

Referring to FIG. 9, a fractional sample position of a reference sample located in a prediction direction of the directional intra-prediction mode based on the target sample may be derived as $\tan\theta*(y+1)$. The $\tan\theta$ value for each angle $\theta$ of each directional intra-prediction mode for calculating the fractional sample position may be scaled in advance in units of integers and defined in order to facilitate calculation. The $\tan\theta$ values of the respective scaled directional intra-prediction modes may be derived as shown in the following table.

TABLE 1

| | predModeIntra | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| intraPredAngle | — | 32 | 29 | 26 | 23 | 21 | 19 | 17 | 15 | 13 | 11 | 9 | 7 | 5 | 3 | 2 | 1 |
| | predModeIntra | | | | | | | | | | | | | | | | |
| | 18 | 19 | 20 | 21 | 22 | 23 | 24 | 25 | 26 | 27 | 28 | 29 | 30 | 31 | 32 | 33 | 34 |
| intraPredAngle | 0 | 1 | 2 | 3 | 5 | 7 | 9 | 11 | 13 | 15 | 17 | 19 | 21 | 23 | 26 | 29 | 32 |
| | predModeIntra | | | | | | | | | | | | | | | | |
| | 35 | 36 | 37 | 38 | 39 | 40 | 41 | 42 | 43 | 44 | 45 | 46 | 47 | 48 | 49 | 50 | 51 |
| intraPredAngle | 29 | 26 | 23 | 21 | 19 | 17 | 15 | 13 | 11 | 9 | 7 | 5 | 3 | 2 | 1 | 0 | 1 |
| | predModeIntra | | | | | | | | | | | | | | | | |
| | 52 | 53 | 54 | 55 | 56 | 57 | 58 | 59 | 60 | 61 | 62 | 63 | 64 | 65 | 66 | | |
| intraPredAngle | 2 | 3 | 5 | 7 | 9 | 11 | 13 | 15 | 17 | 19 | 21 | 23 | 26 | 29 | 32 | | |

Here, predModeIntra-may represent each directional intra-prediction mode, and intraPredAngle may represent a prediction angle of each directional intra-prediction mode or a scaled tan θ approximate value of each directional intra-prediction mode. The tan θ approximate value according to the predefined intra-prediction mode may 6 be derived based on Table 1. Meanwhile, a tan−1θ value of each scaled directional intra-prediction mode may be derived as show in the following table.

TABLE 2

| | predModeIntra | | | | | | | |
|---|---|---|---|---|---|---|---|---|
| | 19 | 20 | 21 | 22 | 23 | 24 | 25 | 26 |
| invAngle | −8192 | −4096 | −2731 | −1638 | −1170 | −910 | −745 | −630 |
| | predModeIntra | | | | | | | |
| | 27 | 28 | 29 | 30 | 31 | 32 | 33 | 34 |
| invAngle | −546 | −482 | −431 | −390 | −356 | −315 | −282 | −256 |
| | predModeIntra | | | | | | | |
| | 35 | 36 | 37 | 38 | 39 | 40 | 41 | 42 |
| invAngle | −282 | −315 | −356 | −390 | −431 | −482 | −546 | −630 |
| | predModeIntra | | | | | | | |
| | 43 | 44 | 45 | 46 | 47 | 48 | 49 | |
| invAngle | −745 | −910 | −1170 | −1638 | −2731 | −4096 | −8192 | |

Here, predModeIntra-may represent each directional intra-prediction mode, intraPredAngle may represent an inverse prediction angle of each directional intra-prediction mode or the scaled tan−1θ approximate value of each directional intra-prediction mode. The tan−1θ approximate value according to predefined intra-prediction mode based on Table 2 may be derived.

Meanwhile, the non-directional intra-prediction mode may be applied to the current block. The non-directional intra-prediction modes may include a planar intra-prediction mode and a DC intra-prediction mode. The planar intra-prediction mode may be referred to as a planar mode and the DC intra-prediction mode may be referred to as a DC mode. In the DC mode, a prediction sample of the current block may be derived based on an average value of neighboring samples of the current block. Intra-prediction based on the DC mode may be efficiently performed when the values of the samples of the current block are similar. Meanwhile, when intra-prediction is performed based on the DC mode when the values of the samples of the current block are varied, discontinuity may occur between a predicted block of the current block and neighboring samples. In a similar case, even when intra-prediction is performed based on the directional intra-prediction mode, unintentional visible contouring may occur. The planner mode has been devised to overcome this problem. The planar mode indicates a prediction mode in which horizontal linear prediction and vertical linear prediction are performed based on reference samples regarding the target sample and derived values are subsequently averaged to generate a prediction sample of the target sample.

Meanwhile, in the case that a prediction is performed based on a directional intra-prediction mode for the current block, reference samples are duplicated in a specific prediction directional angle of a specific directional intra-prediction mode which is derived in an intra-prediction mode of the current block, and a prediction block of the current block may be generated. In other words, all prediction samples of the current block may be derived based on the reference samples derived based on the same specific prediction directional angle. Accordingly, the present disclosure proposes a method for deriving reference samples for the prediction samples based on different prediction directional angles and deriving the prediction samples based on the reference samples. That is, the prediction samples of the current block may be generated based on a plurality of intra-prediction modes. The method described above may also be called a variable angle prediction or a variable intra-prediction mode. More accurate reference sample for each of the samples of the current block may be derived, and accordingly, a prediction accuracy for the current block may be improved. In addition, the prediction accuracy for the current block may be improved, and a residual signal of the current block may be reduced, and accordingly, overall coding rate may be improved.

As an example, a prediction angle for the target sample may be adjusted based on a type of the intra-prediction mode of the current block and a distance between the target sample and the reference sample in the current block. Particularly, in the case that the directional intra-prediction mode is applied to the current block, the prediction angle of the intra-prediction mode may be determined, and each of all samples of the current block may be derived by duplicating the reference sample which is derived based on the prediction angle based on a position of each sample. In other words, each of all samples of the current block may be derived based on the reference sample located in the prediction direction of the intra-prediction mode based on each sample. In this case, the directional intra-prediction mode may represent a mode that configures the current block only with straight prediction samples of the prediction angle that corresponds to the directional intra-prediction mode. However, since an image may include an object including a curve in addition to a straight line, the method of generating a prediction block of the current block only with the mode that configures the prediction block of the current block only with straight prediction samples may be limited in a prediction accuracy. In addition, in the case that a mode among the intra-prediction modes of 45 degree angle is applied to the current block, the prediction accuracy for bottom right samples of the current block which is far from to neighboring samples and left neighboring samples of the current block may be abruptly degraded. Here, the intra-prediction modes of 45 degree angle may include #2 intra-prediction mode, #34 intra-prediction mode and #66 intra-prediction mode.

Accordingly, the problem described above may be solved when a prediction angle may be adjusted variably in the current block. That is, in the case that a proper prediction direction is determined for each sample in the current block, and a prediction sample of each of the samples is generated based on the reference sample located in a prediction direction of the each of the samples, a prediction accuracy may be improved. Accordingly, the present disclosure proposes methods for performing an intra-prediction of the current block based on various prediction angles as described below.

For example, an intra-prediction mode of the target sample may be changed based on a distance between a target sample and a neighboring sample of the current block. Particularly, the intra-prediction mode may include 2 non-directional intra-prediction modes and 65 directional intra-prediction modes, and the directional intra-prediction modes may be divided into a vertical directional intra-prediction mode and a horizontal directional intra-prediction mode based on the #34 intra-prediction mode. Particularly, the vertical directional intra-prediction mode may include the #34 intra-prediction mode to #65 intra-prediction mode, and the horizontal directional intra-prediction mode may include #2 intra-prediction mode to #33 intra-prediction mode. Depending on whether the intra-prediction mode for the current block corresponds to the vertical directional intra-prediction mode or the horizontal directional intra-prediction mode, a neighboring sample for deriving a changed intra-prediction mode of the target sample may be differently selected. For example, in the case that the intra-prediction mode for the current block is the vertical directional intra-prediction mode, a changed intra-prediction mode of the target sample may be derived based on a distance between the target sample and the top neighboring sample. The distance between the target sample and the top neighboring sample may be calculated based on trigonometrical function (e.g., tan θ) according to a prediction angle of the intra-prediction mode described above or may be derived based on a block size and a predefined table for the intra-prediction mode.

In addition, in the case that the intra-prediction mode for the current block is the horizontal directional intra-prediction mode, a changed intra-prediction mode of the target sample may be derived based on a distance between the target sample and the left neighboring sample. The distance between the target sample and the left neighboring sample may be calculated based on trigonometrical function (e.g., tan θ) according to a prediction angle of the intra-prediction mode described above or may be derived based on a block size and a predefined table for the intra-prediction mode.

Furthermore, the distance between the target sample and the neighboring sample which is a reference for deriving the changed intra-prediction mode of the target sample may be derived based on information signaled from the encoding apparatus, and a predefined value in the encoding apparatus and the decoding apparatus may be used as the distance between the target sample and the neighboring sample. In addition, the distance between the target sample and the neighboring sample may be derived based on the intra-prediction mode of the current block, a size of the current block, whether to MPM hit or a presence of a block that performs a variable angle prediction among the neighboring blocks of the current block.

Meanwhile, in the case that the variable intra-prediction mode is applied to the current block, as described above, the intra-prediction mode for the target sample may be derived based on the information for the distance between the target sample and the neighboring sample. As a specific example, in the case that a size of the current block is N×N, the prediction angle may be changed when the distance between the target sample and the neighboring sample is greater than N. That is, in the case that an intra-prediction of the current block is determined, and in the case that the distance between the target sample and the neighboring sample is greater than N, the changed intra-prediction mode of the target sample may be derived, and the prediction sample of the target sample may be derived based on the changed intra-prediction mode. Further, in the case that the variable intra-prediction mode is applied to the current block, the intra-prediction mode for the target sample may be derived based on the information for the distance between the target sample and the neighboring sample as below.

Figure 10:
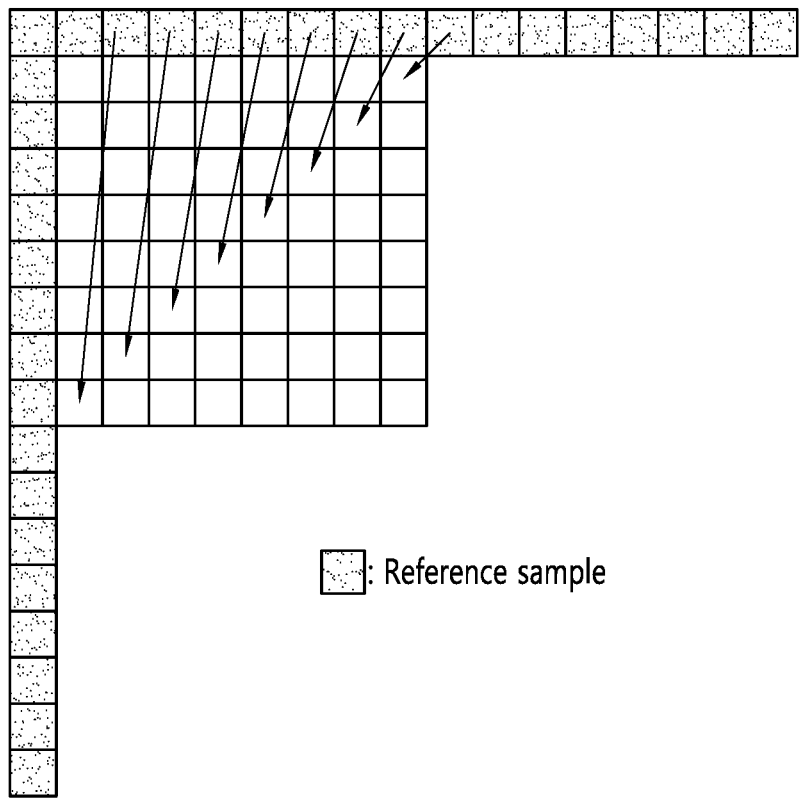
FIG. 10 illustrates an example that the intra-prediction mode for the target sample is derived based on the information for the distance between the target sample and the neighboring sample.

FIG. 10 illustrates an example that the intra-prediction mode for the target sample is derived based on the information for the distance between the target sample and the neighboring sample. For example, referring to FIG. 10, in the case that x component of a top-left sample position of the current block is 0, and y component thereof is 0, the intra-prediction mode of the current block may be selected as one of the x component and the y component, and the changed intra-prediction mode for the target sample may be derived based on the selected component. As the distance between the target sample and the neighboring sample increases, the prediction angle may be changed.

Particularly, the changed intra-prediction mode for the target sample may be derived as the intra-prediction mode of which intraPredAngle value is more increased or decreased than the intra-prediction mode of the current block depending on a change of the x component and the y component of the target sample.

For example, referring to FIG. 10, in the case that the intra-prediction mode of the current block is #66 intra-prediction mode, and in the case that the y component value of the target sample of the current block is 0, the intra-prediction mode for the target sample may be derived as #66 intra-prediction mode. Also, in the case that the intra-prediction mode of the current block is #66 intra-prediction mode, and in the case that the y component value of the target sample of the current block is 1, the intra-prediction mode for the target sample may be derived as #65 intra-prediction mode. That is, in the case that the intra-prediction mode of the current block is #66 intra-prediction mode, since the #66 intra-prediction mode is the vertical directional intra-prediction mode, the top neighboring sample may be selected as a reference for deriving the intra-prediction mode for the target sample. And, as the distance between the target sample and the top neighboring sample increases, that is, in order to change the intra-prediction mode based on the distance between the target sample and the top neighboring sample, the intra-prediction mode for the target sample may be derived as #66-y intra-prediction mode. Meanwhile, as the amount of change of the intra-prediction mode according to the distance between the target sample and the top neighboring sample, y/2 or y/4 as well as y may be used. In other words, the intra-prediction mode for the target sample may be derived as #66-y intra-prediction mode and may also be derived as #66-y/2 intra-prediction mode or #66-y/4 intra-prediction mode. The amount of change of the intra-prediction mode according to the distance between the target sample and the top neighboring sample may be derived based on a block size or mode information or may be derived based on a value of information related to the amount of change which is transmitted from an encoder.

Figure 11:
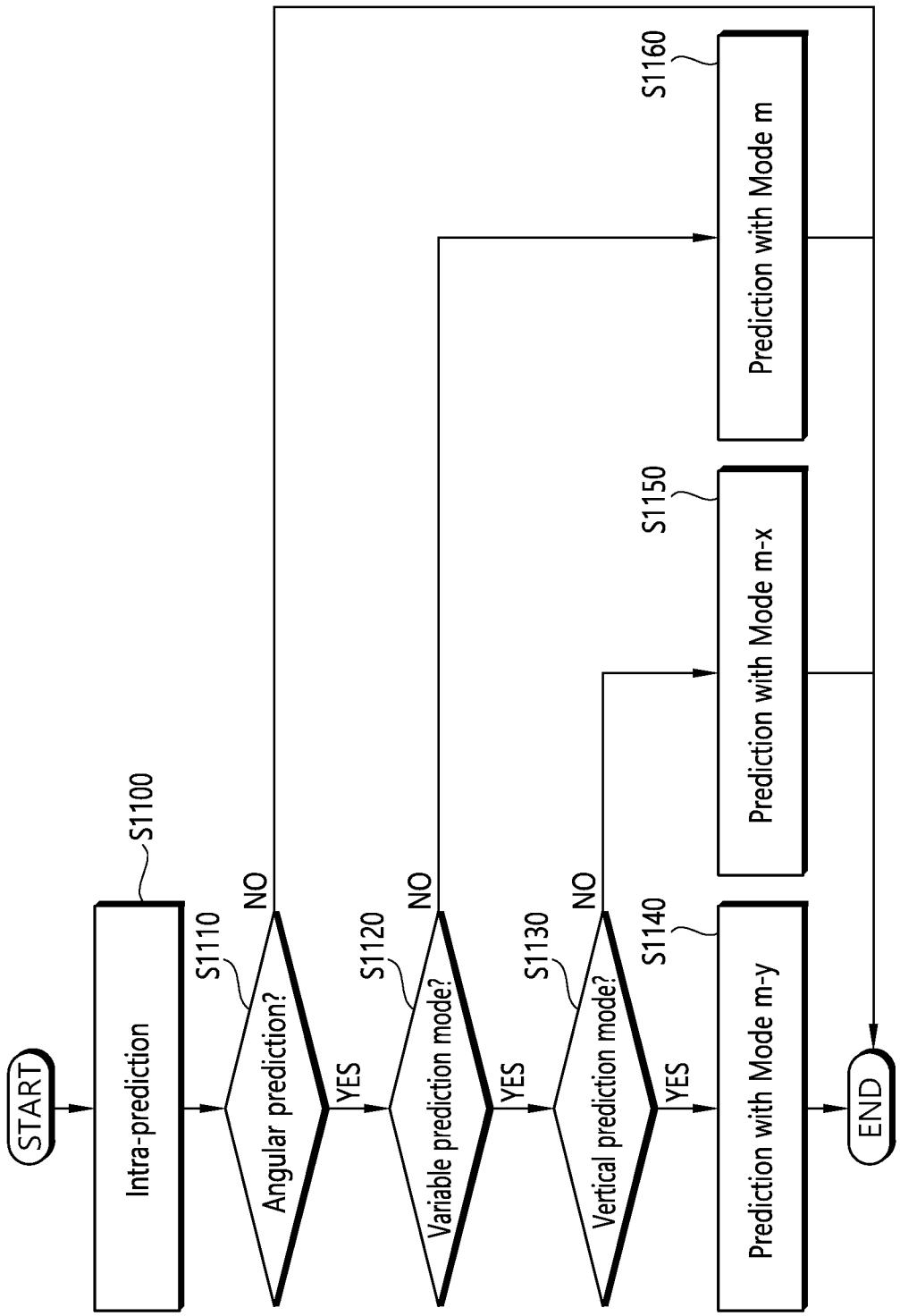
FIG. 11 illustrates an example that the intra-prediction is performed for the target sample of the current block in the case that a variable intra-prediction mode is applied to the current block.

FIG. 11 illustrates an example that the intra-prediction is performed for the target sample of the current block in the case that a variable intra-prediction mode is applied to the current block. The encoding apparatus/decoding apparatus may derive an intra-prediction mode for the current block (step, S1100), and may determine whether the intra-prediction mode is the directional intra-prediction mode (step, S1110). The directional intra-prediction mode may also be represented as an angle prediction. In the case that the intra-prediction mode is the directional intra-prediction mode, the encoding apparatus/decoding apparatus may determine whether to apply the variable intra-prediction mode to the current block (step, S1120). The encoding apparatus may determine whether to apply the variable intra-prediction mode to the current block and may signal information representing whether to apply the variable intra-prediction mode to the current block. The variable intra-prediction mode may also be represented as a variable prediction mode. The decoding apparatus may derive whether to apply the variable intra-prediction mode to the current block based on information which is received through a bitstream. For example, a flag representing whether to apply the variable intra-prediction mode to the current block may be signaled, and it may be determined whether to apply the variable intra-prediction mode to the current block based on the flag value.

In the case that the variable intra-prediction mode is applied to the current block, the encoding apparatus/decoding apparatus may determine whether the intra-prediction mode for the current block is the vertical directional intra-prediction mode (step, S1130). The vertical directional intra-prediction mode may also be represented as a vertical prediction mode. In the case that the intra-prediction mode for the current block is the vertical directional intra-prediction mode, the intra-prediction mode for the target sample may be derived as #m-y intra-prediction mode (step, S1140). Here, m may represent a mode number of the intra-prediction mode for the current block, and y may represent the y component of the target sample. In addition, in the case that the intra-prediction mode for the current block is not the vertical directional intra-prediction mode, that is, in the case that the intra-prediction mode for the current block is not the horizontal directional intra-prediction mode, the intra-prediction mode for the target sample may be derived as #m-x intra-prediction mode (step, S1150). Here, m may represent a mode number of the intra-prediction mode for the current block, and x may represent the x component of the target sample. A prediction sample of the target sample may be generated based on the intra-prediction mode for the target sample. Meanwhile, in the case that the variable intra-prediction mode is not applied to the current block, the intra-prediction mode for the target sample may be derived as #m intra-prediction mode (step, S1160).

In the case that the variable intra-prediction mode is applied and a prediction is performed, more accurate prediction may be performed for an object including a curbed boundary, not a straight boundary. In addition, the distance between the target sample and the reference sample for the target sample may be reduced, and through this, a more accurate prediction may be performed.

Meanwhile, in the case that the distance value between a sample in the current block and the reference sample is a specific value or greater, as a method for deriving the reference samples for the prediction samples based on different prediction direction angles and deriving the prediction samples based on the reference samples, a method may be proposed, in which a prediction angle of the intra-prediction mode is changed. The specific value which is a reference of the prediction angle change may be derived based on information signaled from the encoding apparatus or a preconfigured value to the encoding apparatus and the decoding apparatus. Alternatively, the specific value which is a reference of the prediction angle change may be derived based on the intra-prediction mode of the current block, a size of the current block, whether to MPM hit or a presence of a block in which the variable intra-prediction mode is applied among the neighboring blocks of the current block.

Figure 12:
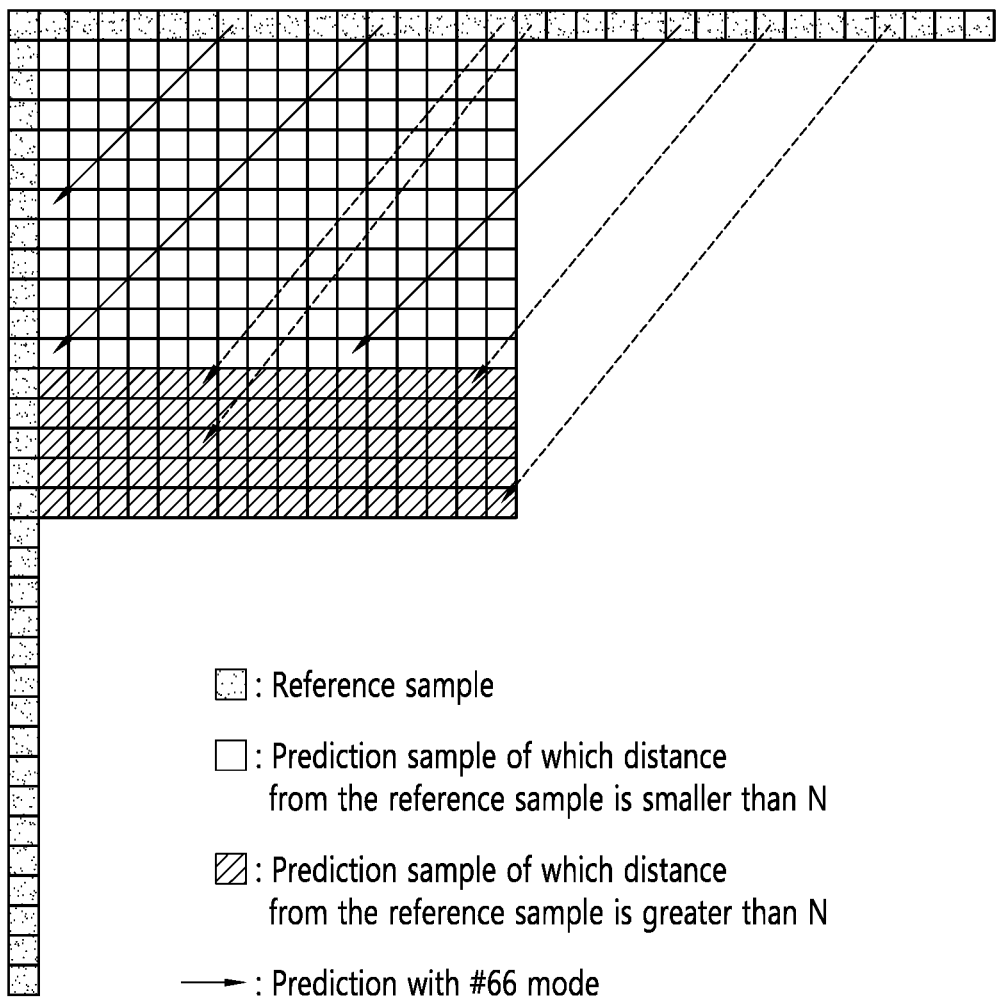
FIG. 12 illustrates an example of changing the intra-prediction mode of the target sample in the case that the distance value between the target sample of the current block and the reference sample is a specific value or greater.

FIG. 12 illustrates an example of changing the intra-prediction mode of the target sample in the case that the distance value between the target sample of the current block and the reference sample is a specific value or greater. Referring to FIG. 12, in the case that a size of the current block is N×N, the intra-prediction mode for the target sample may be changed when the distance between the target sample and the reference sample for the target sample is greater than N. For example, in the case that the distance between the target sample and the reference sample for the target sample is greater than N, the intra-prediction mode for the target sample may be derived as the intra-prediction mode of which intraPredAngle is more increased or decreased by a level than the intra-prediction mode of the current block. That is, in the case that the intra-prediction mode of the current block is #m intra-prediction mode, and in the case that the distance between the target sample and the reference sample for the target sample is greater than N, the intra-prediction mode of the target sample may be derived as #m−1 intra-prediction mode or #m+1 intra-prediction mode. Here, the reference sample for the target sample may represent a neighboring sample located in a prediction direction of the intra-prediction mode of the current block based on the target sample. FIG. 12 may show an example of the case that the intra-prediction mode of the current block is derived as #66 intra-prediction mode. Referring to FIG. 12, the intra-prediction mode of the current block is derived as #66 intra-prediction mode, and the intra-prediction mode of the samples of which distance from the reference sample is N or greater among the samples of the current block may be changed to #65 intra-prediction mode. Among the samples of which distance from the reference sample derived based on the intra-prediction mode of the current block is N or greater, the reference sample derived based on the changed intra-prediction mode, that is, the intra-prediction mode of the sample of which distance from the reference sample derived based on #65 intra-prediction mode is also N or greater may be changed to #64 intra-prediction mode, and a prediction may be performed based on the #64 intra-prediction mode.

Meanwhile, the current block may be a non-square block, not a square block. In this case, it may be selected whether the specific value which is a reference of the prediction angle change is defined as a width or a height of the current block based on a type of the intra-prediction mode of the current block. Here, the type of the intra-prediction mode may represent whether the intra-prediction mode is the horizontal directional intra-prediction mode or the vertical directional intra-prediction mode. For example, in the case that the current block is a non-square block of 16×8 size, and in the case that the intra-prediction mode of the current block is #42 intra-prediction mode which is the vertical directional intra-prediction mode, the specific value which is a reference of the prediction angle change may be derived as 8 which is a height of the current block. Also, in the case that the current block is a non-square block of 16×8 size, and in the case that the intra-prediction mode of the current block is the horizontal directional intra-prediction mode, the specific value which is a reference of the prediction angle change may be derived as 16 which is a width of the current block.

Figure 13:
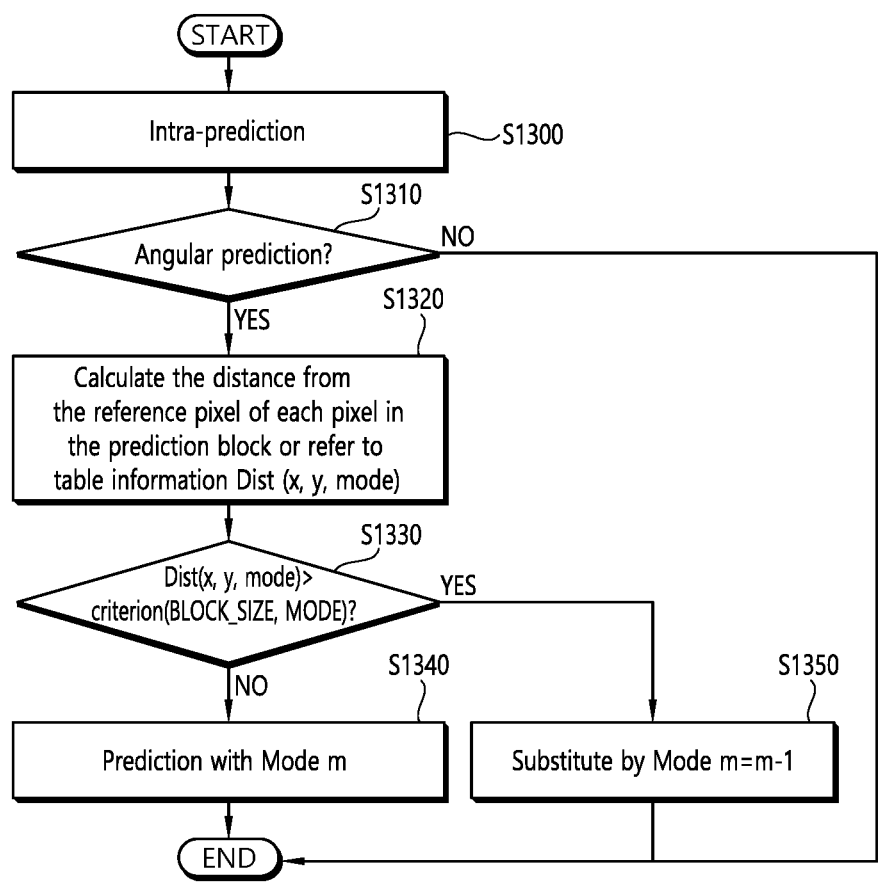
FIG. 13 illustrates an example of performing an intra-prediction for the target sample of the current block based on the variable intra-prediction mode that changes the intra-prediction mode of the target sample in the case that the distance value between the target sample of the current block and the reference sample is a specific value or greater.

FIG. 13 illustrates an example of performing an intra-prediction for the target sample of the current block based on the variable intra-prediction mode that changes the intra-prediction mode of the target sample in the case that the distance value between the target sample of the current block and the reference sample is a specific value or greater.

The encoding apparatus/decoding apparatus may derive the intra-prediction mode for the current block (step, S1300) and determine whether the intra-prediction mode is the directional intra-prediction mode (step, S1310). In the case that the intra-prediction mode is the directional intra-prediction mode, the encoding apparatus/decoding apparatus may calculate the distance between the target sample in the current block and the reference sample of the target sample or may derive the distance between the target sample and the reference sample of the target sample based on a prestored table (step, S1320). Here, Dist (x, y, mode) may represent the distance from the reference sample of the target sample. In the case that a prestored table is used, x component, y component of the target sample and a value corresponding to the intra-prediction mode may be derived based on the prestored table. Alternatively, the reference sample of the target sample may represent a neighboring sample located in a prediction direction of the intra-prediction mode of the current block based on the target sample.

The encoding apparatus/decoding apparatus may determine whether the distance between the target sample and the reference sample of the target sample is greater than a specific value (step, S1330). The specific value may be derived based on information signaled from the encoding apparatus, and a predefined value in the encoding apparatus and the decoding apparatus, as described above. Alternatively, the specific value may be derived based on the intra-prediction mode of the current block, a size of the current block, whether to MPM hit or a presence of a block in which the variable intra-prediction mode is applied among the neighboring blocks of the current block.

In the case that the distance between the target sample and the reference sample is not greater than the specific value, the encoding apparatus/decoding apparatus may perform a prediction for the target sample based on the intra-prediction mode of the current block (step, S1340). That is, in the case that the intra-prediction mode of the current block is #m intra-prediction mode, the encoding apparatus/decoding apparatus may perform a prediction for the target sample based on the #m intra-prediction mode.

In the case that the distance between the target sample and the reference sample is greater than the specific value, the encoding apparatus/decoding apparatus may derive the intra-prediction mode of which mode number is smaller than the intra-prediction mode of the current block by 1 as the intra-prediction mode for the target sample (step, S1350). That is, in the case that the intra-prediction mode of the current block is #m intra-prediction mode, the encoding apparatus/decoding apparatus may derive #m−1 intra-prediction mode as the intra-prediction mode for the target sample and perform a prediction for the target sample based on the #m−1 intra-prediction mode.

Meanwhile, as a method for performing an intra-prediction based on a plurality of prediction angles, it may be proposed a variable intra-prediction mode in which a prediction for the current block is performed based on an intra-prediction mode having a prediction angle greater than that of the existing #66 intra-prediction mode and a prediction for the samples of which index of the reference sample among the samples in the current block is derived as a value of 2N or greater is performed based on the existing #66 intra-prediction mode. Here, the intra-prediction mode having a prediction angle greater than that of the existing #66 intra-prediction mode may be defined as changed #66 intra-prediction mode or defined as a separate intra-prediction mode, for example, #67 intra-prediction mode. In addition, the reference sample may represent a neighboring sample located in a prediction direction of the intra-prediction mode having a prediction angle greater than that of the existing #66 intra-prediction mode, and the index of the reference sample may be derived based on the intra-prediction mode having a prediction angle greater than that of the existing #66 intra-prediction mode. Meanwhile, the index may be called a reference sample index. The method for performing a prediction based on the changed #66 intra-prediction mode may be the same as that of shown in FIG. 14.

Figure 14:
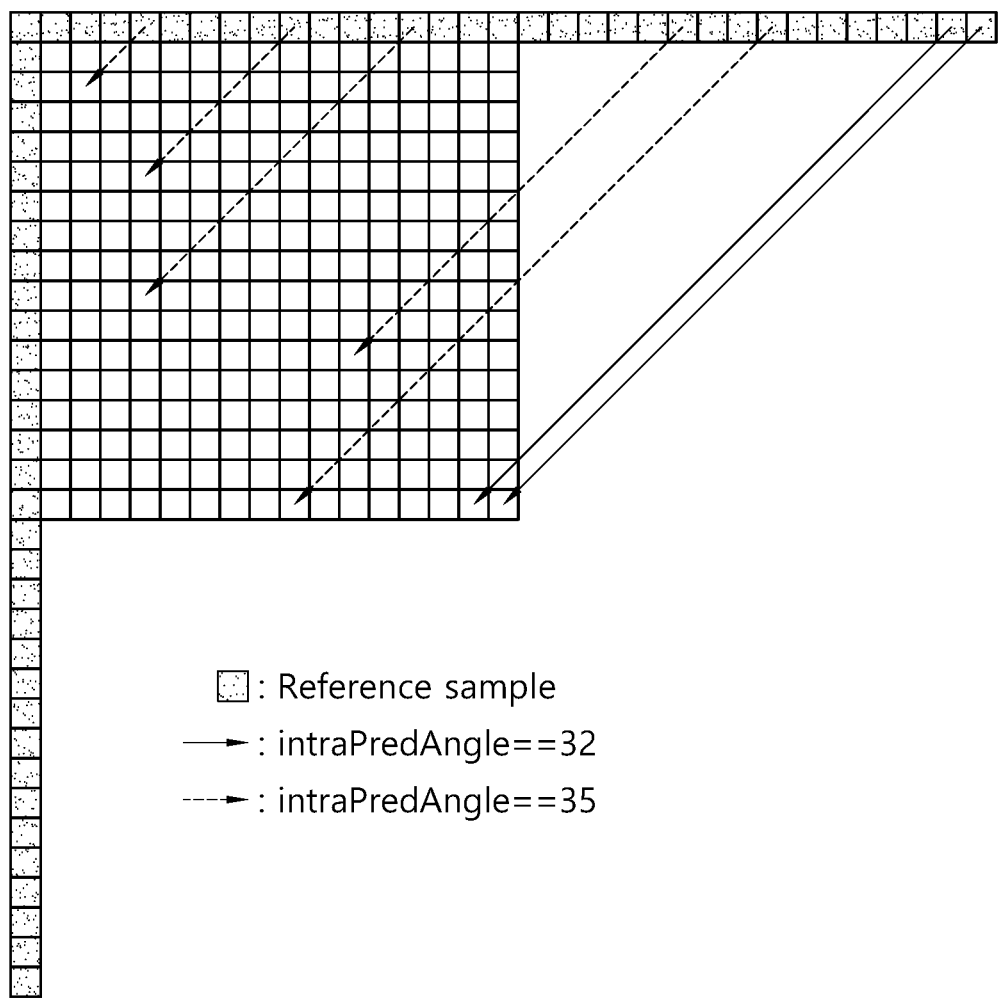
FIG. 14 illustrates an example of performing a prediction based on the changed #66 intra-prediction mode.

FIG. 14 illustrates an example of performing a prediction based on the changed #66 intra-prediction mode. Referring to FIG. 14, in the case that a size of the current block is N×N, for the intra-prediction of the current block, it may be derived 2N top neighboring samples, top left neighboring sample and 2N left neighboring samples for the current block. Accordingly, since the number of the top neighboring samples is 2N, and the reference sample index indicates the reference sample based on the intra-prediction mode among the top neighboring samples, the reference sample index indicating the top neighboring samples may have values of 0 to 2N−1 from left to right. That is, in the case that a value of the reference sample index is 0, the value may represent the top neighboring sample located in the leftmost position among the top neighboring samples, and in the case that a value of the reference sample index is 2N−1, the value may represent the top neighboring sample located in the rightmost position among the top neighboring samples. Similarly, the reference sample index indicating the left neighboring samples may have values 0 to 2N−1 from top to bottom. That is, in the case that a value of the reference sample index is 0, the value may represent the left neighboring sample located in the topmost position among the left neighboring samples, and in the case that a value of the reference sample index is 2N−1, the value may represent the left neighboring sample located in the bottommost position among the left neighboring samples. The reference sample index may be derived based on a position of the target sample in which the intra-prediction mode and prediction are performed. For example, the reference sample index of the target sample may be derived based on the following equation.

$$iIdx = ((y+1) \times intraPredAngle) >> 5 \qquad [\text{Equation 1}]$$

Herein, iIdx may represent a reference sample index indicating the reference sample of the target sample, y may represent y component of the target sample, and intraPredAngle may represent a prediction angle of an intra-prediction mode. In the case that the changed #66 intra-prediction mode is applied to the current block, the intraPredAngle may represent a prediction angle of the changed #66 intra-prediction mode.

In the case that the intra-prediction mode having a prediction angle greater than that of the #66 intra-prediction mode is defined as the changed #66 intra-prediction mode, the prediction angle of the changed #66 intra-prediction mode may be represented as the table below.

TABLE 3

| predModeIntra | 66 | 66 |
|---|---|---|
| iIdx < 2N? | FALSE | TRUE |
| intraPredAngle | 32 | 35 |
| invAngle | −256 | — |

Herein, predModeIntra may represent a mode number of an intra-prediction mode, intraPredAngle may represent a prediction angle of an intra-prediction mode, and invAngle may represent an inverse number of the prediction angle of an intra-prediction mode. In addition, iIdx may represent the reference sample index. Referring to Table 3, in the case that a value of the reference sample index is 2N or greater, a prediction may be performed based on the reference sample which is derived based on the prediction angle of the existing #66 intra-prediction mode, and in the case that a value of the reference sample index is 2N or smaller, a prediction may be performed based on the reference sample which is derived based on the prediction angle (intraPredAngle) of the changed #66 intra-prediction mode. Here, the prediction angle value of the changed #66 intra-prediction mode may be 35, and the reference sample index may represent the index which is derived based on the prediction angle of the changed #66 intra-prediction mode. In the case that a value of the reference sample index of the target sample which is derived based on the changed #66 intra-prediction mode is 2N or greater, since the neighboring sample referred for the prediction of the target sample is not present, in this case, a prediction may be performed based on the reference sample which is derived based on the prediction angle of the existing #66 intra-prediction mode. It may be determined whether to apply the changed #66 intra-prediction mode based on the flag indicating whether the changed #66 intra-prediction mode is applied, or may be derived based on various conditions such as the intra-prediction mode of the current block, a size of the current block, whether to MPM hit or a presence of a block in which the variable intra-prediction mode is applied among the neighboring blocks of the current block.

Meanwhile, it may be defined a separate intra-prediction mode having a prediction angle of an angle greater than the prediction angle of the existing #66 intra-prediction mode. That is, as represented in the above example, the angle greater than the prediction angle of the existing #66 intra-prediction mode may be defined as the changed #66 intra-prediction mode, and the prediction angle may be determined based on the reference sample index of the target sample. Alternatively, the angle greater than the prediction angle of the existing #66 intra-prediction mode may be defined as #67 intra-prediction mode, and either one of the #66 intra-prediction mode or the #67 intra-prediction mode may be determined as the intra-prediction mode of the target sample based on the reference sample index of the target sample.

Figure 15:
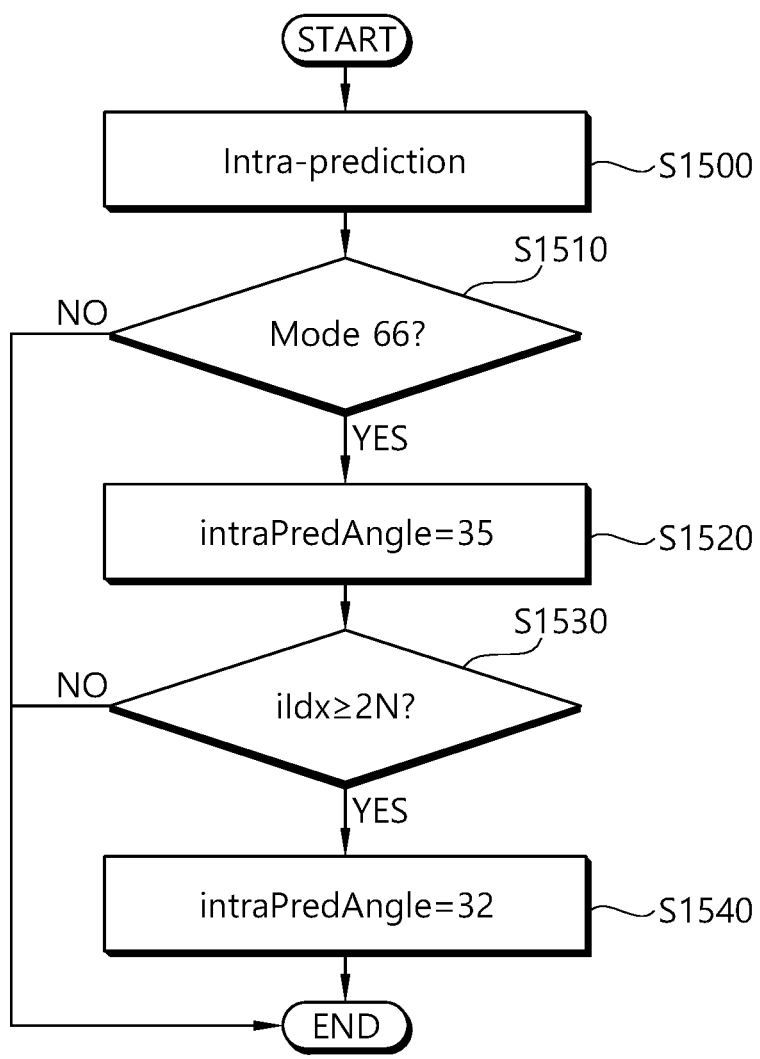
FIG. 15 illustrates an example selecting the changed #66 intra-prediction mode or the existing #66 intra-prediction mode based on the reference sample index of the target sample and performing an intra-prediction for the target sample of the current block based on the selected intra-prediction mode.

FIG. 15 illustrates an example selecting the changed #66 intra-prediction mode or the existing #66 intra-prediction mode based on the reference sample index of the target sample and performing an intra-prediction for the target sample of the current block based on the selected intra-prediction mode.

The encoding apparatus/decoding apparatus may derive the intra-prediction mode for the current block (step, S1500) and determine whether the intra-prediction mode is the #66 intra-prediction mode (step, S1510). In the case that the intra-prediction mode is the #66 intra-prediction mode, the encoding apparatus/decoding apparatus may derive a prediction angle of the current block as the prediction angle greater than the prediction angle of the existing #66 intra-prediction mode (step, S1520). For example, the value of the prediction angle of the existing #66 intra-prediction mode may be 32, and the value of the prediction angle greater than the prediction angle of the existing #66 intra-prediction mode may be 35. In the case that the prediction angle of the current block is derived as 35, the encoding apparatus/decoding apparatus may derive a reference sample index for the target sample based on the prediction angle and determine whether the reference sample index for the target sample is 2N or greater (step, S1530). In the case that the reference sample index for the target sample is 2N or greater, the encoding apparatus/decoding apparatus may derive the prediction angle for the target sample as 32 and perform a prediction for the target sample based on the prediction angle derived as 32 (step, S1540). Also, in the case that the reference sample index for the target sample is smaller than 2N, the encoding apparatus/decoding apparatus may perform a prediction for the target sample based on the prediction angle derived as 35.

Meanwhile, whether to apply the variable intra-prediction mode to the current block may be derived based on various conditions such as the intra-prediction mode of the current block, a size of the current block, whether to MPM hit or a presence of a block in which the variable intra-prediction mode is applied among the neighboring blocks of the current block, as described above. The detailed method therefor may be described below.

As an example, it may be determined whether to apply the variable intra-prediction mode to the current block based on a size of the current block. For example, in the case that a size of the current block is the same as or greater than a specific size, the variable intra-prediction mode described above may be applied to the current block, and in the case that a size of the current block is smaller than a specific size, the variable intra-prediction mode described above may not be applied to the current block. In addition, information for the size to which the variable intra-prediction mode is applied may be received from the encoding apparatus, and in the case that the size of the current block corresponds to the size indicated by the information, the variable intra-prediction mode described above may be applied to the current block. The information for the size to which the variable intra-prediction mode is applied may be signaled through a video parameter set (VPS), a sequence parameter set (SPS), a picture parameter set (PPS) or a slice segment header, and also signaled in a block unit.

As another example, based on a component of the current block, that is, based on whether the current block is the chroma component or the luma component, it may be determined whether to apply the variable intra-prediction mode to the current block. For example, the variable intra-prediction mode may applied to a block of the luma component only. In this case, the variable intra-prediction mode may applied only in the case that the current block is the luma component. Alternatively, based on a composition ratio of the chroma component or the luma component, that is, a color format, it may be determined whether to apply the variable intra-prediction mode to the current block. For example, in the case of an input image in which 4:2:0 color format or 4:2:2 color format is used, the variable intra-prediction mode may applied to a block of the luma component only. In this case, the variable intra-prediction mode may applied only in the case that the current block is the luma component. Also, in the case of an input image in which 4:4:4 color format is used, the variable intra-prediction mode may applied to both the luma component block and the chroma component block. Meanwhile, the 4:2:0 color format, 4:2:2 color format or 4:2:2 color format may represent the YCbCr color format, and the YCbCr color format may represent a composition ratio of the luma component, the chroma Cb component and the chroma Cr component. Also, the variable intra-prediction mode may be determined based on various color formats in addition to the YCbCr color format.

As another example, it may be determined whether to apply the variable intra-prediction mode to a block of the chroma component corresponding to the luma component based on information on whether an object having a curved boundary in the block of the luma component is present. In this case, since the information on whether an object having a curved boundary in the block of the luma component is present may be derived based on the information for the block of the luma component, it may be determined whether to apply the variable intra-prediction mode to the block of the chroma component without transmission of additional information. In addition, additional information is signaled, and it may be applied a method in which it may be determined whether to apply the variable intra-prediction mode to the block of the chroma component more accurately.

As another example, it may be determined whether to apply the variable intra-prediction mode to the current block. based on the intra-prediction mode of the current block. For example, in the case that the intra-prediction mode of the current block is one of the vertical intra-prediction mode (#50 intra-prediction mode), the intra-prediction modes of which mode number difference from the vertical intra-prediction mode is within 2 (#48 intra-prediction mode, #49 intra-prediction mode, #51 intra-prediction mode and #52 intra-prediction mode), the horizontal intra-prediction mode (#18 intra-prediction mode) and the intra-prediction modes of which mode number difference from the horizontal intra-prediction mode is within 2 (#16 intra-prediction mode, #17 intra-prediction mode, #19 intra-prediction mode and #20 intra-prediction mode), the method of performing a prediction of the current block based on a prediction angle which is reduced in comparison with that of the intra-prediction mode of the current block may not be applied among the methods of performing the variable intra-prediction mode. Also, in the case that the intra-prediction mode of the current block is one of #2 intra-prediction mode, #34 intra-prediction mode, #66 intra-prediction mode and the intra-prediction modes of which mode number difference from the #66 intra-prediction mode is within 2 (#64 intra-prediction mode and #65 intra-prediction mode), the method of performing a prediction of the current block based on a prediction angle which is increased in comparison with that of the intra-prediction mode of the current block may not be applied among the methods of performing the variable intra-prediction mode.

Figure 16:
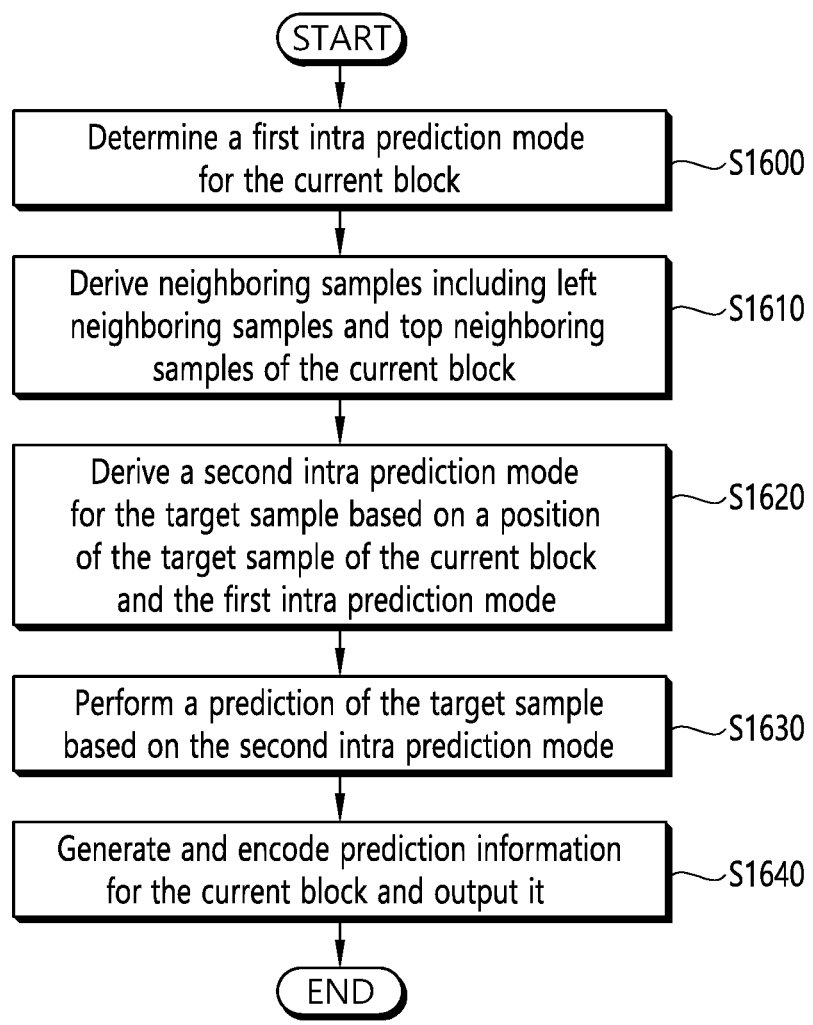
FIG. 16 schematically illustrates a video encoding method by the encoding apparatus according to the present disclosure.

FIG. 16 schematically illustrates a video encoding method by the encoding apparatus according to the present disclosure. The method shown in FIG. 16 may be performed by the encoding apparatus shown in FIG. 1. In a specific example, steps S1600 to S1630 of FIG. 16 may be performed by the predictor of the encoding apparatus, and step S1640 may be performed by the entropy encoder of the encoding apparatus.

The encoding apparatus determines a first intra-prediction mode for the current block (step, S1600). The encoding apparatus may perform various intra-prediction modes and derive the intra-prediction mode having an optimal RD cost as the first intra-prediction mode for the current block. The first intra-prediction mode may be one of 2 non-directional prediction modes and 33 directional prediction modes. The 2 non-directional prediction modes may include intra DC mode and intra planar mode as described above. Alternatively, the first intra-prediction mode may be one of 2 non-directional prediction modes and 65 directional prediction modes. The non-directional prediction modes may include intra DC mode and intra planar mode as described above. In addition, the 65 directional prediction modes may include the vertical directional intra-prediction modes and the horizontal directional intra-prediction modes. The vertical directional intra-prediction modes may include #34 intra-prediction mode to #66 intra-prediction modes, and the horizontal directional intra-prediction modes may include #2 intra-prediction mode to #33 intra-prediction modes.

The encoding apparatus derives neighboring samples including left neighboring samples and top neighboring samples of the current block (step, S1610). The encoding apparatus may derive the neighboring samples of the current block. The neighboring samples may include the left neighboring samples and the top neighboring samples. In addition, the neighboring samples may include top left neighboring sample. The left neighboring samples, the top left neighboring sample and the top neighboring samples may be derived from neighboring samples which are already reconstructed on a decoding timing of the current block. 2N of the top neighboring samples, the top left neighboring sample and 2N of the left neighboring samples of the current block may be derived. Here, in the case that a size of the current block is N×N, the x component is 0 and the y component is 0 of the top left sample of the current block, the left neighboring samples may be p[−1][0] to p[−1][2N−1], the top left neighboring sample may be p[−1][−1], and the top neighboring samples may be p[0][−1] to p[2N−1][−1].

The encoding apparatus derives a second intra-prediction mode for the target sample based on a position of the target sample of the current block and the first intra-prediction mode (step, S1620). The encoding apparatus may derive the second intra-prediction mode based on a position of the target sample of the current block.

For example, in the case that the x component is 0 and they component is 0 of the top left sample of the current block, the x component is a and the y component is b of the target sample, and the first intra-prediction mode is #m intra-prediction mode which is one of the vertical directional prediction modes, the second intra-prediction mode for the target sample may be derived as #m-b intra-prediction mode. In addition, the second intra-prediction mode for the target sample may be derived as #m-(b/n) intra-prediction mode. The n may be derived based on a size of the current block or the first intra-prediction mode. In addition, the encoding apparatus may generate information for the n.

In addition, as another example, in the case that a x component of a top left sample of the current block is 0 and a y component of the top left sample of the current block is 0, a x component of the target sample is a and a y component of the target sample is b, and the first intra-prediction mode is #m intra-prediction mode which is one of the horizontal directional prediction modes, the second intra-prediction mode for the target sample may be derived as #m-a intra-prediction mode. In addition, the second intra-prediction mode for the target sample may be derived as #m-(a/n) intra-prediction mode. The n may be derived based on a size of the current block or the first intra-prediction mode. In addition, the encoding apparatus may generate information for the n.

In addition, as another example, the encoding apparatus may derive a first reference sample located in a prediction direction of the first intra-prediction mode based on the target sample among the neighboring samples, and in the case that the first intra-prediction mode is #m intra-prediction mode, and a distance between the target sample and the first reference sample is greater than a specific value, derive #m−1 intra-prediction mode as the second intra-prediction mode for the target sample. Here, the specific value may be derived based the size of the current block. For example, in the case that the size of the current block is N×N, the specific value may be derived as N. Meanwhile, the current block may be a non-square block, not a square block. In this case, it may be selected whether the specific value is derived based on a width or a height of the current block according to whether the first intra-prediction mode is the horizontal directional intra-prediction mode or the vertical directional intra-prediction mode. For example, in the case that the size of the current block is N×M and the first intra-prediction mode is one of the vertical directional intra-prediction modes, the specific value may be derived as N. That is, in the case that the first intra-prediction mode is one of the vertical directional intra-prediction modes, the specific value may be derived based on the height of the current block. Also, in the case that the size of the current block is N×M and the first intra-prediction mode is one of the horizontal directional intra-prediction modes, the specific value may be derived as N. That is, in the case that the first intra-prediction mode is one of the horizontal directional intra-prediction modes, the specific value may be derived based on the width of the current block. The encoding apparatus may generate information for the specific value.

In addition, as another example, the encoding apparatus may derive the first reference sample located in a prediction direction of the first intra-prediction mode based on the target sample among the neighboring samples, and in the case that the first intra-prediction mode is #m intra-prediction mode, and a distance between the target sample and the first reference sample is greater than a specific value, derive #m−1 intra-prediction mode as the second intra-prediction mode for the target sample, and in the case that a distance between the target sample and the first reference sample is not greater than the specific value, derive #m−1 intra-prediction mode as the second intra-prediction mode for the target sample, and in the case that a distance between the target sample and the first reference sample is greater than the specific value, derive #m−2 intra-prediction mode as the second intra-prediction mode for the target sample. Here, the specific value may be derived based on the size of the current block as described above.

Meanwhile, as another example, the first intra-prediction mode of the current block may be an intra-prediction mode of which prediction angle value is 35. The intra-prediction mode of which prediction angle value is 35 may be configured as #66 intra-prediction mode or configured as separate #67 intra-prediction mode.

In this case, the encoding apparatus may derive a reference sample index based on the position of the target sample and the first intra-prediction mode, and in the case that the size of the current block is N×N and the value of the reference sample index is 2N or greater, the intra-prediction mode of which prediction angle value is 32 as the second intra-prediction mode. Here, the intra-prediction mode of which prediction angle value is 32 may represent #66 intra-prediction mode. In the case that the intra-prediction mode of which prediction angle value is 35 is configured as #66 intra-prediction mode, the prediction angle value of the #66 intra-prediction mode may be derived as 35 in the case that the value of the reference sample index is smaller than 2N, and derived as 32 in the case that the value of the reference sample index is 2N or greater. Meanwhile, the reference sample index may represent a neighboring sample located in the prediction direction of the first intra-prediction mode based on the target sample. In addition, in the case that the first intra-prediction mode is one of the vertical directional intra-prediction modes, the reference sample index may be derived based on Equation 1 described above.

Meanwhile, the encoding apparatus may determine whether to derive the second intra-prediction mode for the target sample. It may be derived whether to derive the second intra-prediction mode for the target sample based on various conditions such as the intra-prediction mode of the current block, a size of the current block, whether to MPM hit or a presence of a block in which the second intra-prediction mode is applied among the neighboring blocks of the current block.

Particularly, for example, the encoding apparatus may determine whether to derive the second intra-prediction mode for the target sample based on the size of the current block. For example, in the case that the size of the current block is the same as or greater than a specific size, the second intra-prediction mode for the target sample may be derived based on the position of the target sample of the current block and the first intra-prediction mode, and in the case that the size of the current block is smaller than a specific size, the second intra-prediction mode may not be derived. Meanwhile, the encoding apparatus may generate information for the specific value.

As another example, the encoding apparatus may determine whether to derive the second intra-prediction mode for the target sample based on whether a component of the current block is the chroma component or the luma component. For example, in the case that the current block is a block of the luma component, the second intra-prediction mode for the target sample may be derived based on the position of the target sample of the current block and the first intra-prediction mode, and in the case that the current block is a block of the chroma component, the second intra-prediction mode may not be derived.

Alternatively, for example, based on a composition ratio of the chroma component and the luma component, that is, a color format, it may be determined whether to derive the second intra-prediction mode for the target sample. For example, in the case of an input image in which 4:2:0 color format or 4:2:2 color format is used, and the current block is the block of the luma component, the second intra-prediction mode for the target sample may be derived based on the position of the target sample of the current block and the first intra-prediction mode, and in the case that the current block is the block of the chroma component, the second intra-prediction mode may not be derived. Also, in the case that 4:4:4 color format is used, without regard to whether the current block is the chroma component or the luma component, the second intra-prediction mode for the target sample may be derived based on the position of the target sample of the current block and the first intra-prediction mode. Meanwhile, the 4:2:0 color format, 4:2:2 color format or 4:2:2 color format may represent the YCbCr color format, and the YCbCr color format may represent a composition ratio of the luma component, the chroma Cb component and the chroma Cr component. Also, it may be determined whether to derive the second intra-prediction mode for the target sample based on various color formats in addition to the YCbCr color format.

As another example, in the case that the current block is the block of the chroma component, it may be determined whether to derive the second intra-prediction mode for the target sample based on information on whether an object having a curved boundary in the block of the luma component corresponding to the current block is present. In this case, the information on whether an object having a curved boundary in the block of the luma component is present based on the information for the block of the luma component.

As another example, the encoding apparatus may determine whether to derive the second intra-prediction mode for the target sample based on the first intra-prediction mode of the current block. For example, in the case that the first intra-prediction mode of the current block is one of the vertical intra-prediction mode (#50 intra-prediction mode), the intra-prediction modes of which mode number difference from the vertical intra-prediction mode is within 2 (#48 intra-prediction mode, #49 intra-prediction mode, #51 intra-prediction mode and #52 intra-prediction mode), the horizontal intra-prediction mode (#18 intra-prediction mode) and the intra-prediction modes of which mode number difference from the horizontal intra-prediction mode is within 2 (#16 intra-prediction mode, #17 intra-prediction mode, #19 intra-prediction mode and #20 intra-prediction mode), the prediction angle of the second intra-prediction mode may not be derived as being smaller than the prediction angle of the first intra-prediction mode, and the prediction angle of the second intra-prediction mode may be derived as being greater than the prediction angle of the first intra-prediction mode. Also, in the case that the intra-prediction mode of the current block is one of #2 intra-prediction mode, #34 intra-prediction mode, #66 intra-prediction mode and the intra-prediction modes of which mode number difference from the #66 intra-prediction mode is within 2 (#64 intra-prediction mode and #65 intra-prediction mode), the prediction angle of the second intra-prediction mode may not be derived as being greater than the prediction angle of the first intra-prediction mode, and the prediction angle of the second intra-prediction mode may be derived as being smaller than the prediction angle of the first intra-prediction mode.

The encoding apparatus performs a prediction of the target sample based on the second intra-prediction mode (step, S1630). The encoding apparatus may derive a reference sample located in a prediction direction of the second intra-prediction mode based on the target sample among the neighboring samples. The encoding apparatus may generate a prediction sample of the target sample based on the reference sample. The encoding apparatus may derive a sample value of the prediction sample by duplicating a sample value of the target sample.

The encoding apparatus generates and encodes prediction information for the current block and outputs it (step, S1640). The encoding apparatus may encode the prediction information for the current block and output it in bitstream format. The prediction information may include information for the first intra-prediction mode of the current block. The encoding apparatus may generate and encode the information for the intra-prediction mode indicating the first intra-prediction mode and output it in bitstream format. The information for the first intra-prediction mode may include information directly indicating the first intra-prediction mode of the current block or include information indicating any one candidate in the intra-prediction mode candidate list which is derived based on the intra-prediction mode of left or top block of the current block.

In addition, the prediction information may include information for the second intra-prediction mode for the target sample of the current block. The information for the second intra-prediction mode may be signaled through a video parameter set (VPS), a sequence parameter set (SPS), a picture parameter set (PPS) or a slice segment header, and also signaled in a block unit.

The information for the second intra-prediction mode may include a flag indicating whether to derive the second intra-prediction mode for the target sample. In the case that the flag indicates that the second intra-prediction mode for the target sample is derived, the second intra-prediction mode for the target sample may be derived based on the position of the target sample of the current block and the first intra-prediction mode, and in the case that the flag indicates that the second intra-prediction mode for the target sample is not derived, the second intra-prediction mode for the target sample may not be derived. For example, in the case that a value of the flag is 1, the flag may indicate that the second intra-prediction mode for the target sample is derived, and in the case that a value of the flag is 0, the flag may indicate that the second intra-prediction mode for the target sample is not derived.

In addition, in the case that the second intra-prediction mode for the target sample is derived as #m−(b/n) intra-prediction mode, the information for the second intra-prediction mode may include information for the n. In addition, in the case that the second intra-prediction mode for the target sample is derived as #m−(a/n) intra-prediction mode, the information for the second intra-prediction mode may include information for the n.

In addition, in the case that the distance between the target sample and the first reference sample is greater than a specific value, the encoding apparatus may derive #m−1 intra-prediction mode as the second intra-prediction mode for the target sample. In this case, the information for the second intra-prediction mode may include information for the specific value.

In addition, in the case that the size of the current block is the same as or greater than a specific size, the second intra-prediction mode for the target sample may be derived based on the position of the target sample of the current block and the first intra-prediction mode, and in the case that the size of the current block is smaller than a specific size, the second intra-prediction mode may not be derived. In this case, the information for the second intra-prediction mode may include information for the specific size. The information indicating the specific size may be signaled through a video parameter set (VPS), a sequence parameter set (SPS), a picture parameter set (PPS) or a slice segment header, and also signaled in a block unit.

Figure 17:
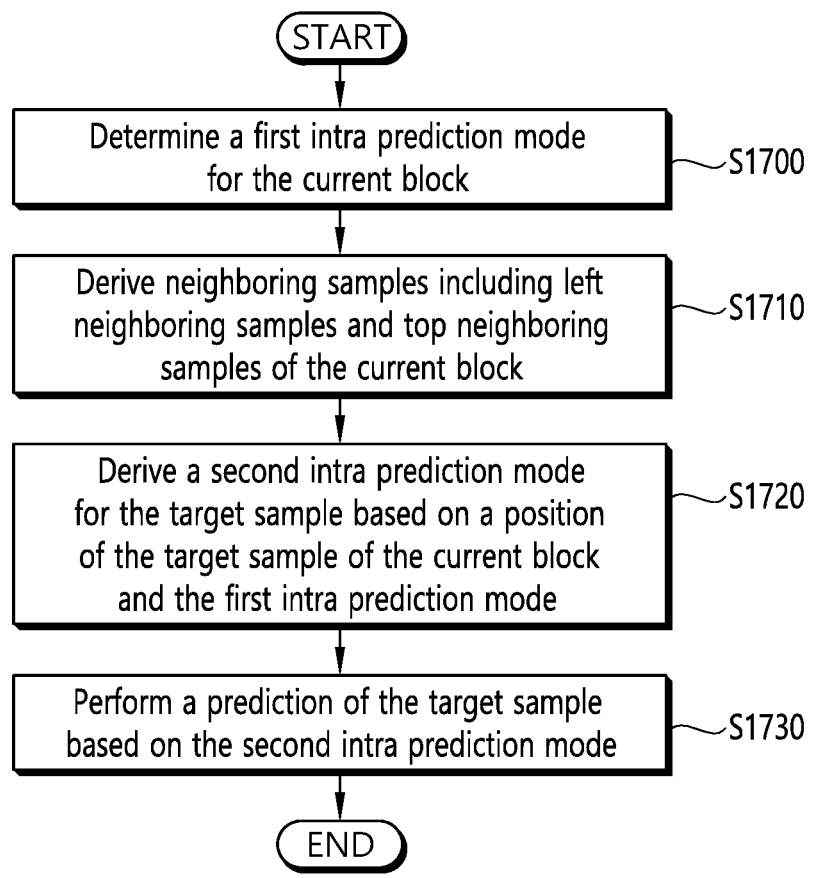
FIG. 17 schematically illustrates a video encoding method by the decoding apparatus according to the present disclosure.

FIG. 17 schematically illustrates a video encoding method by the decoding apparatus according to the present disclosure. The method shown in FIG. 17 may be performed by the decoding apparatus shown in FIG. 4. In a specific example, steps S1700 to S1730 of FIG. 16 may be performed by the predictor of the decoding apparatus, and step S1740 may be performed by the entropy encoder of the encoding apparatus.

The decoding apparatus derives the first intra-prediction mode for the current block (step, S1700). The decoding apparatus may acquire the prediction information for the current block through a bitstream. The prediction information may include information directly indicating the first intra-prediction mode of the current block or include information indicating any one candidate in the intra-prediction mode candidate list which is derived based on the intra-prediction mode of left or top block of the current block. The decoding apparatus may derive the first intra-prediction mode for the current block based on the acquired prediction information. The first intra-prediction mode may be one of 2 non-directional prediction modes and 33 directional prediction modes. The 2 non-directional prediction modes may include intra DC mode and intra planar mode as described above. Alternatively, the first intra-prediction mode may be one of 2 non-directional prediction modes and 65 directional prediction modes. The non-directional prediction modes may include intra DC mode and intra planar mode as described above. In addition, the 65 directional prediction modes may include the vertical directional intra-prediction modes and the horizontal directional intra-prediction modes. The vertical directional intra-prediction modes may include #34 intra-prediction mode to #66 intra-prediction modes, and the horizontal directional intra-prediction modes may include #2 intra-prediction mode to #33 intra-prediction modes.

The decoding apparatus derives neighboring samples including left neighboring samples and top neighboring samples of the current block (step, S1710). The decoding apparatus may derive the neighboring samples of the current block. The neighboring samples may include the left neighboring samples and the top neighboring samples. In addition, the neighboring samples may include top left neighboring sample. The left neighboring samples, the top left neighboring sample and the top neighboring samples may be derived from neighboring samples which are already reconstructed on a decoding timing of the current block. 2N of the top neighboring samples, the top left neighboring sample and 2N of the left neighboring samples of the current block may be derived. Here, in the case that a size of the current block is N×N, the x component of the top left sample of the current block is 0 and the y component of the top left sample of the current block is 0, the left neighboring samples may be p[−1][0] to p[−1][2N−1], the top left neighboring sample may be p[−1][−1], and the top neighboring samples may be p[0][−1] to p[2N−1][−1].

The decoding apparatus derives a second intra-prediction mode for the target sample based on a position of the target sample of the current block and the first intra-prediction mode (step, S1720). The decoding apparatus may derive the second intra-prediction mode based on a position of the target sample of the current block.

For example, in the case that a x component of a top left sample of the current block is 0 and a y component of the top left sample of the current block is 0, a x component of the target sample is a and a y component of the target sample is b, and the first intra-prediction mode is #m intra-prediction mode which is one of the vertical directional intra-prediction modes, the second intra-prediction mode for the target sample may be derived as #m-b intra-prediction mode. In addition, the second intra-prediction mode for the target sample may be derived as #m−(b/n) intra-prediction mode. The n may be derived based on a size of the current block or the first intra-prediction mode. In addition, the decoding apparatus may receive information for the n and derive the n based in the information for the n. The information for the n may be included in the information for the second intra-prediction mode.

In addition, as another example, in the case that a x component of a top left sample of the current block is 0 and a y component of the top left sample of the current block is 0, a x component of the target sample is a and a y component of the target sample is b, and the first intra-prediction mode is #m intra-prediction mode which is one of the horizontal directional intra-prediction modes, the second intra-prediction mode for the target sample may be derived as #m-a intra-prediction mode. In addition, the second intra-prediction mode for the target sample may be derived as #m−(a/n) intra-prediction mode. The n may be derived based on a size of the current block or the first intra-prediction mode. In addition, the decoding apparatus may receive information for the n and derive the n based in the information for the n. The information for the n may be included in the information for the second intra-prediction mode.

In addition, as another example, the decoding apparatus may derive a first reference sample located in a prediction direction of the first intra-prediction mode based on the target sample among the neighboring samples, and in the case that the first intra-prediction mode is #m intra-prediction mode, and a distance between the target sample and the first reference sample is greater than a specific value, derive #m−1 intra-prediction mode as the second intra-prediction mode for the target sample. Here, the specific value may be derived based the size of the current block. For example, in the case that the size of the current block is N×N, the specific value may be derived as N. Meanwhile, the current block may be a non-square block, not a square block. In this case, it may be selected whether the specific value is derived based on a width or a height of the current block according to whether the first intra-prediction mode is the horizontal directional intra-prediction mode or the vertical directional intra-prediction mode. For example, in the case that the size of the current block is N×M and the first intra-prediction mode is one of the vertical directional intra-prediction modes, the specific value may be derived as N. That is, in the case that the first intra-prediction mode is one of the vertical directional intra-prediction modes, the specific value may be derived based on the height of the current block. Also, in the case that the size of the current block is N×M and the first intra-prediction mode is one of the horizontal directional intra-prediction modes, the specific value may be derived as N. That is, in the case that the first intra-prediction mode is one of the horizontal directional intra-prediction modes, the specific value may be derived based on the width of the current block. In addition, the decoding apparatus may receive information for the specific value and derive the specific value based in the information for the specific value. The information for the specific value may be included in the information for the second intra-prediction mode.

In addition, as another example, the decoding apparatus may derive the first reference sample located in a prediction direction of the first intra-prediction mode based on the target sample among the neighboring samples, and in the case that the first intra-prediction mode is #m intra-prediction mode, and a distance between the target sample and the first reference sample is greater than a specific value, derive #m−1 intra-prediction mode as the second intra-prediction mode for the target sample, and in the case that a distance between the target sample and the first reference sample is not greater than the specific value, derive #m−1 intra-prediction mode as the second intra-prediction mode for the target sample, and in the case that a distance between the target sample and the first reference sample is greater than the specific value, derive #m−2 intra-prediction mode as the second intra-prediction mode for the target sample. Here, the specific value may be derived based on the size of the current block as described above.

Meanwhile, as another example, the first intra-prediction mode of the current block may be an intra-prediction mode of which prediction angle value is 35. The intra-prediction mode of which prediction angle value is 35 may be configured as #66 intra-prediction mode or configured as separate #67 intra-prediction mode.

In this case, the decoding apparatus may derive a reference sample index based on the position of the target sample and the first intra-prediction mode, and in the case that the size of the current block is N×N and the value of the reference sample index is 2N or greater, the intra-prediction mode of which prediction angle value is 32 as the second intra-prediction mode. Here, the intra-prediction mode of which prediction angle value is 32 may represent #66 intra-prediction mode. In the case that the intra-prediction mode of which prediction angle value is 35 is configured as #66 intra-prediction mode, the prediction angle value of the #66 intra-prediction mode may be derived as 35 in the case that the value of the reference sample index is smaller than 2N, and derived as 32 in the case that the value of the reference sample index is 2N or greater. Meanwhile, the reference sample index may represent a neighboring sample located in the prediction direction of the first intra-prediction mode based on the target sample. In addition, in the case that the first intra-prediction mode is one of the vertical directional intra-prediction modes, the reference sample index may be derived based on Equation 1 described above.

Meanwhile, the decoding apparatus may determine whether to derive the second intra-prediction mode for the target sample. It may be derived whether to derive the second intra-prediction mode for the target sample based on various conditions such as the intra-prediction mode of the current block, a size of the current block, whether to MPM hit or a presence of a block in which the second intra-prediction mode is applied among the neighboring blocks of the current block.

Particularly, for example, the decoding apparatus may determine whether to derive the second intra-prediction mode for the target sample based on the size of the current block. For example, in the case that the size of the current block is the same as or greater than a specific size, the second intra-prediction mode for the target sample may be derived based on the position of the target sample of the current block and the first intra-prediction mode, and in the case that the size of the current block is smaller than a specific size, the second intra-prediction mode may not be derived. Meanwhile, the decoding apparatus may receive the information indicating the specific size and derive the specific size which is a reference of whether to derive the second intra-prediction mode based on the information indicating the specific size. The information indicating the specific size may be included in the information for the second intra-prediction mode.

As another example, the decoding apparatus may determine whether to derive the second intra-prediction mode for the target sample based on whether a component of the current block is the chroma component or the luma component. For example, in the case that the current block is a block of the luma component, the second intra-prediction mode for the target sample may be derived based on the position of the target sample of the current block and the first intra-prediction mode, and in the case that the current block is a block of the chroma component, the second intra-prediction mode may not be derived.

Alternatively, for example, based on a composition ratio of the chroma component and the luma component, that is, a color format, it may be determined whether to derive the second intra-prediction mode for the target sample. For example, in the case of an input image in which 4:2:0 color format or 4:2:2 color format is used, and the current block is the block of the luma component, the second intra-prediction mode for the target sample may be derived based on the position of the target sample of the current block and the first intra-prediction mode, and in the case that the current block is the block of the chroma component, the second intra-prediction mode may not be derived. Also, in the case that 4:4:4 color format is used, without regard to whether the current block is the chroma component or the luma component, the second intra-prediction mode for the target sample may be derived based on the position of the target sample of the current block and the first intra-prediction mode. Meanwhile, the 4:2:0 color format, 4:2:2 color format or 4:2:2 color format may represent the YCbCr color format, and the YCbCr color format may represent a composition ratio of the luma component, the chroma Cb component and the chroma Cr component. Also, it may be determined whether to derive the second intra-prediction mode for the target sample based on various color formats in addition to the YCbCr color format.

As another example, in the case that the current block is the block of the chroma component, it may be determined whether to derive the second intra-prediction mode for the target sample based on information on whether an object having a curved boundary in the block of the luma component corresponding to the current block is present. In this case, the information on whether an object having a curved boundary in the block of the luma component is present based on the information for the block of the luma component. In addition, the decoding apparatus may receive the information for the block of the luma component, derive the information for a presence of the information on whether an object having a curved boundary in the block of the luma component is present and determine whether to derive the second intra-prediction mode for the target sample.

As another example, the decoding apparatus may determine whether to derive the second intra-prediction mode for the target sample based on the first intra-prediction mode of the current block. For example, in the case that the first intra-prediction mode of the current block is one of the vertical intra-prediction mode (#50 intra-prediction mode), the intra-prediction modes of which mode number difference from the vertical intra-prediction mode is within 2 (#48 intra-prediction mode, #49 intra-prediction mode, #51 intra-prediction mode and #52 intra-prediction mode), the horizontal intra-prediction mode (#18 intra-prediction mode) and the intra-prediction modes of which mode number difference from the horizontal intra-prediction mode is within 2 (#16 intra-prediction mode, #17 intra-prediction mode, #19 intra-prediction mode and #20 intra-prediction mode), the prediction angle of the second intra-prediction mode may not be derived as being smaller than the prediction angle of the first intra-prediction mode, and the prediction angle of the second intra-prediction mode may be derived as being greater than the prediction angle of the first intra-prediction mode. Also, in the case that the intra-prediction mode of the current block is one of #2 intra-prediction mode, #34 intra-prediction mode, #66 intra-prediction mode and the intra-prediction modes of which mode number difference from the #66 intra-prediction mode is within 2 (#64 intra-prediction mode and #65 intra-prediction mode), the prediction angle of the second intra-prediction mode may not be derived as being greater than the prediction angle of the first intra-prediction mode, and the prediction angle of the second intra-prediction mode may be derived as being smaller than the prediction angle of the first intra-prediction mode.

In addition, the decoding apparatus may receive a flag indicating whether to derive the second intra-prediction mode for the target sample and determine whether to derive the second intra-prediction mode for the target sample based on the flag. For example, in the case that the flag indicates that the second intra-prediction mode for the target sample is derived, the second intra-prediction mode for the target sample may be derived based on the position of the target sample of the current block and the first intra-prediction mode, and in the case that the flag indicates that the second intra-prediction mode for the target sample is not derived, the second intra-prediction mode for the target sample may not be derived.

The decoding apparatus performs a prediction of the target sample based on the second intra-prediction mode (step, S1730). The decoding apparatus may derive a reference sample located in a prediction direction of the second intra-prediction mode based on the target sample among the neighboring samples. The decoding apparatus may generate a prediction sample of the target sample based on the reference sample. The decoding apparatus may derive a sample value of the prediction sample by duplicating a sample value of the target sample.

Meanwhile, although it is not shown in the drawings, the decoding apparatus may use the prediction sample as a reconstructed sample directly according to a prediction mode or generate a reconstructed sample by adding a residual sample to the prediction sample. In the case that a residual sample for the target block is present, the decoding apparatus may receive information for the residual for the target block, and the information for the residual may be included in information for the phase. The information for the residual may include a transform coefficient for the residual sample. The decoding apparatus may derive the residual sample (or residual sample array) for the target block based on the residual information. The decoding apparatus may generate a reconstructed sample based on the prediction sample and the residual sample and derive a reconstructed block or a reconstructed picture based on the reconstructed sample. Later, the decoding apparatus may apply the in-loop filtering procedure such as deblocking filtering and/or SAO process to the reconstructed picture to improve subjective/objective image quality, as described above.

According to the present disclosure described above, a prediction of a current block can be performed based on a plurality of intra-prediction modes according to a specific condition, and through this, an object of a curved boundary included in the current block is predicted more accurately, and accordingly, a prediction accuracy for the current block can be improved, and a residual for the current block is reduced, and a coding rate can be improved.

In addition, according to the present disclosure, a second intra-prediction mode for a target sample of the current block is derived and a distance between the target sample and a reference sample can be reduced, and through this, a prediction accuracy for the current block can be improved, and a residual for the current block is reduced, and a coding rate can be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present disclosure described above may be implemented in software. The encoding device and/or decoding device according to the present disclosure may be included in a device that performs image processing, for example, for a TV, a computer, a smart phone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a read-only memory (ROM), a random access memory (RAM), a flash memory, a memory card, a storage medium, and/or other storage device.

What is claimed is:

1. A video decoding method performed by a decoding apparatus, the method comprising:
    deriving a first intra-prediction mode for a current block;
    deriving neighboring samples including left neighboring samples and upper neighboring samples of the current block;
    deriving a second intra-prediction mode for a target sample based on a position of the target sample and the first intra-prediction mode; and
    performing prediction of the target sample based on the second intra-prediction mode for the target sample,
    wherein a specific value is derived based a size of the current block, and
    when the size of the current block is N×M and the first intra-prediction mode is one of vertical directional intra-prediction modes, the specific value is derived as N,
    when the size of the current block is N×M and the first intra-prediction mode is one of horizontal directional intra-prediction modes, the specific value is derived as N, and
    wherein the horizontal directional intra-prediction modes include #2 intra-prediction mode to #33 intra-prediction mode, and the vertical directional intra-prediction modes include #34 intra-prediction mode to #66 intra-prediction mode;
    wherein the step of deriving the second intra-prediction mode for the target sample based on the position of the target sample and the first intra-prediction mode includes:
    deriving a first reference sample located in a prediction direction of the first intra-prediction mode based on the target sample among the neighboring samples; and
    when the first intra-prediction mode is #m intra-prediction mode, and a distance between the target sample and the first reference sample is greater than the specific value, deriving another intra-prediction mode as the second intra-prediction mode for the target sample.

2. The video decoding method of claim 1, wherein when a x component of a top left sample of the current block is 0 and a y component of the top left sample of the current block is 0, a x component of the target sample is a and a y component of the target sample is b, and the first intra-prediction mode is #m intra-prediction mode which is one of vertical directional intra-prediction modes, the second intra-prediction mode for the target sample is derived as #m-b intra-prediction mode.

3. The video decoding method of claim 1, wherein when a x component of a top left sample of the current block is 0 and a y component of the top left sample of the current block is 0, a x component of the target sample is a and a y component of the target sample is b, and the first intra-prediction mode is #m intra-prediction mode which is one of horizontal directional intra-prediction modes, the second intra-prediction mode for the target sample is derived as #m-a intra-prediction mode.

4. The video decoding method of claim 1, wherein the step of deriving the second intra-prediction mode for the target sample based on the position of the target sample and the first intra-prediction mode includes:
deriving #m-1 intra-prediction mode as the another intra-prediction mode for the second intra-prediction mode for the target sample.

5. The video decoding method of claim 4, wherein M is equal to N.

6. The video decoding method of claim 1, wherein the step of deriving the second intra-prediction mode for the target sample based on the position of the target sample and the first intra-prediction mode includes:
deriving the second reference sample among the neighboring samples, wherein the second reference sample is located in a prediction direction of #m-1 intra-prediction mode based on the target sample; and
deriving as the another intra-prediction mode for the second intra-prediction mode based on the distance between the target sample and the second reference sample.

7. The video decoding method of claim 6, wherein when the distance between the target sample and the second reference sample is not greater than the specific value, #m-1 intra-prediction mode is derived as the another intra-prediction mode for the second intra-prediction mode for the target sample, and
when the distance between the target sample and the second reference sample is greater than the specific value, #m-2 intra-prediction mode is derived as the another intra-prediction mode for the second intra-prediction mode for the target sample.

8. The video decoding method of claim 1,
wherein the step of deriving as the another intra-prediction mode for the second intra-prediction mode for the target sample based on the position of the target sample and the first intra-prediction mode includes deriving a reference sample index based on the position of the target sample and the first intra-prediction mode,
wherein the reference sample index represents a neighboring sample located in a prediction direction of the first intra-prediction mode based on the target sample,
when the first intra-prediction mode is one of vertical directional intra-prediction modes, the reference sample index is derived based on the following equation:

$$iIdx=((y+1) \times intraPredAngle)>>5$$

wherein, iIdx represents the reference sample index, y represents y component of the target sample, and intraPredAngle represents a prediction angle of the first intra-prediction mode.

9. The video decoding method of claim 1, further comprising receiving a flag indicating whether to derive the second intra-prediction mode for the target sample,
when the flag indicates that the second intra-prediction mode for the target sample is derived, the second intra-prediction mode for the target sample is derived based on the position of the target sample of the current block and the first intra-prediction mode.

10. A video decoding method performed by a decoding apparatus, the method comprising:
deriving a first intra-prediction mode for a current block:
deriving neighboring samples including left neighboring samples and upper neighboring samples of the current block: and
determining whether to derive the second intra-prediction mode for the target sample based on a size of the current block,
when the size of the current block is greater than a specific size, the second intra-prediction mode for the target sample is derived based on the position of the target sample of the current block and the first intra-prediction mode,
wherein prediction of the target sample is performed based on the second intra-prediction mode for the target sample,
wherein the specific value is derived based the size of the current block, and
when the size of the current block is N×M and the first intra-prediction mode is one of vertical directional intra-prediction modes, the specific value is derived as N,
when the size of the current block is N×M and the first intra-prediction mode is one of horizontal directional intra-prediction modes, the specific value is derived as N, and
wherein the horizontal directional intra-prediction modes include #2 intra-prediction mode to #33 intra-prediction mode, and the vertical directional intra-prediction modes include #34 intra-prediction mode to #66 intra-prediction mode;
wherein the step of deriving the second intra-prediction mode for the target sample based on the position of the target sample and the first intra-prediction mode includes:
deriving a first reference sample located in a prediction direction of the first intra-prediction mode based on the target sample among the neighboring samples; and
when the first intra-prediction mode is #m intra-prediction mode, and a distance between the target sample and the first reference sample is greater than the specific value, deriving another intra-prediction mode as the second intra-prediction mode for the target sample.

11. A video encoding method performed by an encoding apparatus, the video encoding method comprising:
deriving a first intra-prediction mode for a current block;
deriving neighboring samples including left neighboring samples and upper neighboring samples of the current block;
deriving a second intra-prediction mode for a target sample based on a position of the target sample and the first intra-prediction mode; and performing prediction of the target sample based on the second intra-prediction mode for the target sample, wherein a specific value is derived based a size of the current block, and when the size of the current block is N×M and the first intra-prediction mode is one of vertical directional intra-prediction modes, the specific value is derived as N, when the size of the current block is N×M and the first intra-prediction mode is one of horizontal directional intra-prediction modes, the specific value is derived as N, and wherein the horizontal directional intra-prediction modes include #2 intra-prediction mode to #33 intra-prediction mode, and the vertical directional intra-prediction modes include #34 intra-prediction mode to #66 intra-prediction mode;

wherein the step of deriving the second intra-prediction mode for the target sample based on the position of the target sample and the first intra-prediction mode includes:

deriving a first reference sample located in a prediction direction of the first intra-prediction mode based on the target sample among the neighboring samples; and when the first intra-prediction mode is #m intra-prediction mode, and a distance between the target sample and the first reference sample is greater than the specific value, deriving another intra-prediction mode as the second intra-prediction mode for the target sample.

12. The video encoding method of claim 11, when a x component of a top left sample of the current block is 0 and a y component of the top left sample of the current block is 0, a x component of the target sample is a and a y component of the target sample is b, and the first intra-prediction mode is #m intra-prediction mode which is one of vertical directional intra-prediction modes, the second intra-prediction mode for the target sample is derived as #m-b intra-prediction mode.

13. The video encoding method of claim 11, wherein the step of deriving the second intra-prediction mode for the target sample based on the position of the target sample and the first intra-prediction mode includes:

deriving #m−1 intra-prediction mode as the another intra-prediction mode for the second intra-prediction mode for the target sample.

14. The video encoding method of claim 13, wherein M is equal to N.

* * * * *